(12) United States Patent
Takaishi

(10) Patent No.: US 7,826,168 B2
(45) Date of Patent: *Nov. 2, 2010

(54) METHOD OF CREATING CORRECTION TABLE FOR HEAD POSITION CONTROL, HEAD POSITION CONTROL METHOD, AND DISK DEVICE

(75) Inventor: Kazuhiko Takaishi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 1625 days.

This patent is subject to a terminal disclaimer.

(21) Appl. No.: 11/086,520

(22) Filed: Mar. 22, 2005

(65) Prior Publication Data

US 2006/0098330 A1    May 11, 2006

(30) Foreign Application Priority Data

Nov. 9, 2004    (JP) .............................. 2004-325451

(51) Int. Cl.
*G11B 5/596* (2006.01)
*G11B 21/02* (2006.01)
*G11B 5/55* (2006.01)

(52) U.S. Cl. ............... 360/77.04; 360/75; 360/78.09; 360/78.07

(58) Field of Classification Search ............... 381/98; 360/77.04, 75, 78.09, 78.07, 78.06
See application file for complete search history.

(56) References Cited

U.S. PATENT DOCUMENTS

| | | | |
|---|---|---|---|
| 5,923,491 A | 7/1999 | Kisaka et al. | |
| 6,128,153 A * | 10/2000 | Hasegawa et al. | 360/77.08 |
| 6,166,875 A * | 12/2000 | Ueno et al. | 360/77.04 |
| 6,421,200 B2 * | 7/2002 | Takaishi | 360/78.09 |
| 6,437,936 B1 | 8/2002 | Chen et al. | |
| 6,549,362 B1 | 4/2003 | Melrose | |
| 6,556,371 B1 | 4/2003 | Ottesen et al. | |
| 6,654,198 B2 | 11/2003 | Liu et al. | |
| 6,850,385 B1 | 2/2005 | Woods | |
| 6,927,934 B2 | 8/2005 | Atsumi | |

(Continued)

FOREIGN PATENT DOCUMENTS

| | | |
|---|---|---|
| JP | 06-096538 | 4/1994 |
| JP | 9-330571 | 12/1997 |
| JP | 11-126444 | 5/1999 |
| JP | 2000-021104 | 1/2000 |
| JP | A 2002-544639 | 12/2002 |
| JP | 2003-331543 | 11/2003 |
| WO | WO 00/68939 | 11/2000 |

OTHER PUBLICATIONS

Ehrlich et al.; "Major HDD TMR Sources and Projected Scaling with TPI"; IEEE Trans. On Magnetics, vol. 35, No. 2, Mar. 1999; pp. 885-891.

(Continued)

*Primary Examiner*—Devona E Faulk
(74) *Attorney, Agent, or Firm*—Greer, Burns & Crain, Ltd.

(57) ABSTRACT

A head position control method controls the position of a head by correcting components synchronizing rotation of a disk based on the head control amount. A correction signal for components synchronizing rotation is generated by using a filter function. The filter function that integrates the sine and cosine terms of DFT and inverse DFT and forms multiply of the complex values a(m) and b(m) and sine and cosine for frequency conversion, is measured in advance. The complex values are the m degree of RRO frequencies having frequency characteristics to be multiplied $(1+C(z)P(z))$ or $-(1+C(z)P(z)/P(z))$.

8 Claims, 30 Drawing Sheets

U.S. PATENT DOCUMENTS

| | | |
|---|---|---|
| 6,937,424 B2 | 8/2005 | Chang et al. |
| 6,999,267 B1 | 2/2006 | Melkote et al. |
| 7,061,710 B2 | 6/2006 | Iwashiro |
| 7,193,808 B2 * | 3/2007 | Takaishi ................ 360/77.04 |
| 7,372,658 B2 * | 5/2008 | Takaishi ................ 360/77.04 |
| 7,564,642 B2 | 7/2009 | Shelton |
| 2003/0184909 A1 * | 10/2003 | Zhang et al. ............ 360/77.04 |
| 2009/0225467 A1 * | 9/2009 | Takaishi ................ 360/75 |

OTHER PUBLICATIONS

Melkote et al.; "A study of radial error propagation and self-servowriting in disk drives"; Proceedings of the American Control Conference, May 8-10, 2002; pp. 1372-1377.

Oraintara et al.; "Integer Fast Fourier Transform"; IEEE Trans. On Signal Processing, vol. 50, No. 3; Mar. 2002; pp. 607-618.

* cited by examiner

Servo Mark / Gray Code / Index / PosA PosB PosC PosD

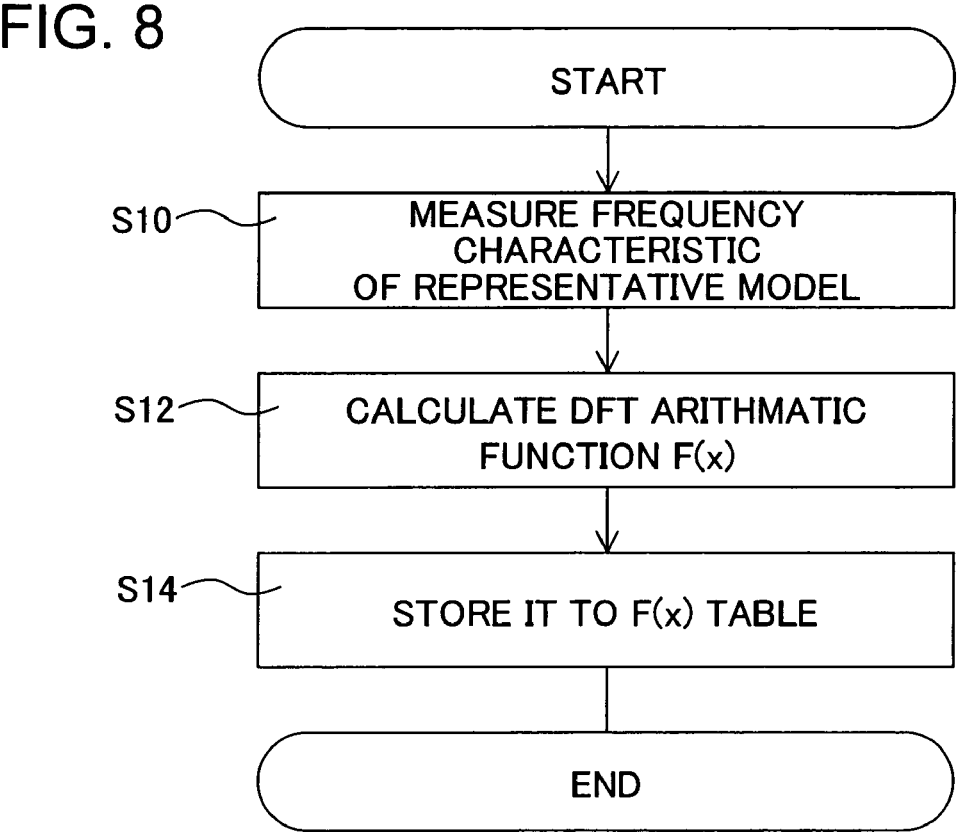
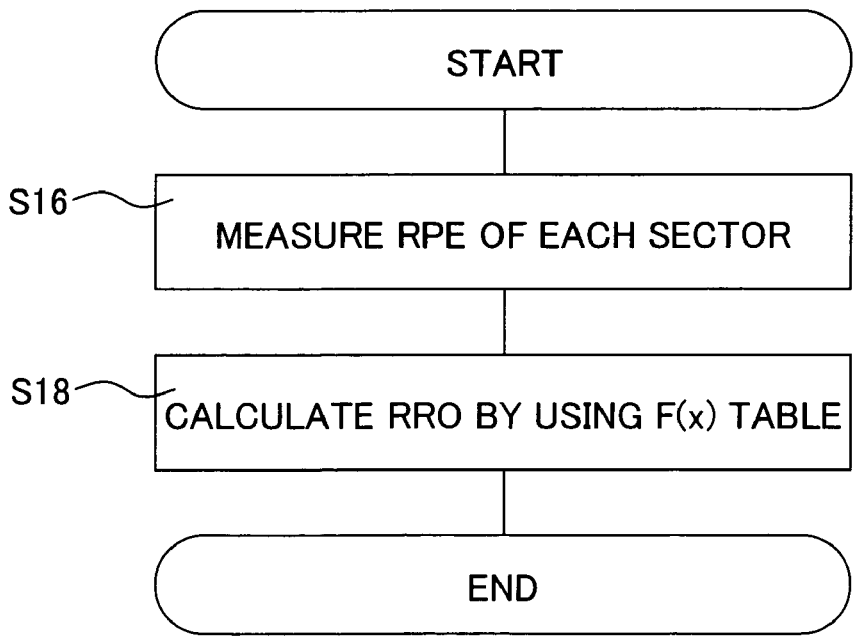

| Track NO. | RRO (R) | RRO (W) | RroZone |
|---|---|---|---|
| 1000 | XX | YY | AAA |
| ⋮ | | | |
| 1999 | XY | YX | |
| 2000 | | | BBB |
| ⋮ | | | |
| 2999 | | | |
| ⋮ | | | |

| Servo Signal @ Sector q-th | RroTable(q) |
|---|---|

METHOD OF CREATING CORRECTION TABLE FOR HEAD POSITION CONTROL, HEAD POSITION CONTROL METHOD, AND DISK DEVICE

CROSS-REFERENCE TO RELATED APPLICATIONS

This application is based upon and claims the benefit of priority from the prior Japanese Patent Application No. 2004-325451, filed on Nov. 9, 2004, the entire contents of which are incorporated herein by reference.

BACKGROUND OF THE INVENTION

1. Field of the Invention

The present invention relates to a correction table creation method of head position control for a disk device which controls the position of a head to a rotating disk, for performing reading and/or writing information from/to the disk, and the head position control method, and the disk device thereof, and more particularly to a correction table creation method of head position control for correcting the rotation synchronization component of the disk and position signal, and the head position control method and the disk device thereof.

2. Description of the Related Art

Disk storage devices for recording to and regenerating data from a rotating disk medium are widely used as storage devices for data. A disk device includes a disk for storing data, a spindle motor for rotating the disk, a head for recording/regenerating information to/from the disk, and an actuator for moving the head to a target position. Typical examples are magnetic disk devices (HDD: hard disk drive) and optical disk devices (DVD-ROM, MO).

In a magnetic disk device, a plurality of position signals for detecting the position of the head are recorded in an arc with respect to the rotation center on the disk, and form a track. A position signal includes a servo mark, track number (graycode) and offset information. The current position of the head can be obtained by the track number and the offset information.

The difference between this position information and the target position is determined, calculation is performed according to the displacement amount, and drive signals for driving the actuator, such as current for VCM (Voice Coil Motor) and voltage for an electro-strictive actuator, are supplied.

The position signal (servo signal) on the disk is either recorded by the disk device itself, which is the STW (Servo Track Write) method, or recorded by an external STW device. The STW method for recording the position signals by the disk device itself includes push-pin STW, self-servo writing and rewrite STW. The method for recording by an external STW device includes a method for recording on a disk, magnetic transfer and discrete media.

In order to accurately record and regenerate data it is necessary to position the head to the position demodulated from the position signal. The position signal, however, includes noise, which deteriorates the positioning accuracy. This noise has a component synchronizing rotation of the spindle motor, and a component not synchronizing rotation. The component synchronizing rotation can be measured and corrected, and can be suppressed to zero if fully measurement time is allowed. For the component not synchronizing with rotation, on the other hand, measurement and correction are difficult. Various methods have been proposed to measure and correct the component synchronizing the rotation.

There are two causes that generate the component synchronizing rotation of the spindle motor in the position signals in a status where vibration is not received from the outside. The first cause is that the servo signals are not accurately recorded concentrically during STW. As long as the servo signals are mechanically recorded, mechanical, electrical and magnetic noises during recording are unavoidable. Therefore to accurately record the servo signals concentrically during STW is extremely difficult.

The second cause if that distortion occurs to the disk and spindle motor after STW. Microscopically, the position signals are not aligned concentrically with respect to the center of rotation of the spindle motor. The track width of current disk drives is around 200 nm, so the influence, even of a slight distortion on positioning accuracy, is extremely large.

The component of fluctuation of the position signals that synchronizes rotation is called "eccentricity" or RRO (Repeatable RunOut), and the component of a one-time rotation frequency is called "primary", and a two-time rotation frequency is called "secondary". If RRO occurs, the positioning accuracy of the head deteriorates, which causes problems with reading and regenerating data. For example, if the position accuracy is poor, when data is recorded on a track, a part of the previously recorded data on the adjacent tracks is overwritten. To prevent such a status, RRO must be controlled in positioning control.

The conventionally available methods of controlling RRO are a method of controlling the actuator to not follow-up RRO but to ignore it, as shown in FIG. 38, and a control method of controlling the actuator to follow-up RRO, as shown in FIG. 40.

FIG. 38 and FIG. 40 show block diagrams of the head position control system, where as a disturbance to be applied to the control system, the components synchronizing rotation of the spindle motor and the components not synchronizing rotation are indicated as RRO, NRRO, RPE and NRPE. RRO (Repeatable RunOut) is a component of positional disturbance synchronizing rotation. NRRO (Non-Repeatable RunOut) is a component of positional disturbance not synchronizing rotation. RPE (Repeatable Position Error) is a component synchronizing rotation included in the position error 'e' when positioning control is performed. And NRPE (Non-Repeatable Position Error) is a component not synchronizing rotation included in the position error 'e' when positioning control is performed. The RRO and RPE, which are components synchronizing rotation, indicate different values at each sample of the servo.

To perform positioning control, it is necessary to know RRO, RPE, and RPE+RRO, and to minimize all these three values. RRO indicates the distortion of the track on the disk. Here the difference from RRO of the adjacent track is critical. This difference value indicates the fluctuation of the track width. As the fluctuation width of the difference value becomes wider, the fluctuation of the track space increases, in other words, areas where the track width is narrower are generated. When vibration is applied from the outside and the position accuracy deteriorates, this RRO determines the width where an overwrite on the recording area of the data of the adjacent track occurs. In other words, suppressing RRO contributes to improving resistance to external vibration.

RPE indicates the displacement from the positioning target. If control is being performed only to follow-up RRO, RPE indicates a deviation from RRO. In ordinary positioning control, RPE is the management target. For example, if RPE is contained in a plus/minus 15% range from the track width, or if this status continues for a predetermined number of samples, data recording is enabled, or it is judged whether seek control completed (settlement completed). In other words, suppressing RPE contributes to shorten the seek response time.

(RPE+RRO) indicates a locus of an actuator in a status where no vibration is applied from the outside. That is, this indicates a data recording position when vibration from the outside is zero. As this shows, suppressing (RPE+RRO) contributes to improving the positioning accuracy and the error rate of recording/regenerating data in ordinary operating status where external vibration is low.

In FIG. 38 and FIG. 40, the actual position 'y' and the position error 'e' can be expressed by the following relational Expression (1), using the target position r, RRO, NRRO, the transfer function of the control system C(z), and the transfer function of the plant (actuator in the case of the magnetic disk device) P(z).

$$y = \frac{C(z) \cdot P(z)}{1 + C(z) \cdot P(z)} r + \frac{1}{1 + C(z) \cdot P(z)} RRO + \frac{1}{1 + C(z) \cdot P(z)} NRRO \quad (1)$$

$$e = y - r$$

Now the status during track follow-up, when the target position 'r' is always the same and no vibration is applied from the outside, will be considered. The term of the target position 'r' at the right hand side in the expression for 'y', shown in Expression (1), is a constant value, and is equal to the input (target position) 'r'. Therefore Expression (2) of the position error 'e' in the track follow-up status is obtained.

$$e = \frac{1}{1 + C(z) \cdot P(z)} RRO + \frac{1}{1 + C(z) \cdot P(z)} NRRO \quad (2)$$

"e" in this status is also the sum of RPE and NRPE. Therefore RRO and NRRO, and RPE and NRPE, are expressed in the following Expression (3). In these expressions, $1/(1+C(z) \cdot P(z))$ is generally called the "sensitivity function".

$$RPE = \frac{1}{1 + C(z) \cdot P(z)} RRO \quad (3)$$

$$NRPE = \frac{1}{1 + C(z) \cdot P(z)} NRRO$$

In this way there is a characteristic difference for the amount of the sensitivity function between RPE and RRO. In other words, there is a difference depending on the frequency. This means that even if RRO can be suppressed, the same suppression rate cannot always be implemented for RPE. And even if RRO can be suppressed 50%, RPE may be suppressed only 20%. The difference in frequency characteristics must be considered.

There are two types of methods to suppress RRO, that is one method for the actuator not to follow-up RRO, as shown in FIG. 38, and another method for the actuator to follow-up RRO, as shown in FIG. 40. Both of these methods have actually been applied to disk drives. A method of using both of these methods is also in use. For example, the actuator follows up RRO in the low frequency area and does not follow-up RRO in the high frequency area.

FIG. 38 shows the method for the actuator not to follow-up RRO. A correction table 100 for storing values, called an "RroTable" is created in advance. And when the positioning control of the disk device is performed, the RroTable value of the correction table 100 is removed from the position error 'e', and the result is used for the controller C(z). In other words, the controller C(z) calculates the control amount from the position error from which RRO is removed. These RroTable values may be different depending on the head, track, read position or write position, or may be the same for each head or each zone formed by a plurality of tracks.

One of the RroTable generation methods that has been proposed is a method of determining RRO by computing the observing position. An example of this computing method is using a discrete Fourier transform (DFT) (e.g. Japanese Patent Application Laid-Open No. 11-126444).

As FIG. 38 shows, the positional locus, that is the RroTable of the correction table 100, is generated from the position error 'e', and RPE included in 'e' is removed. The position error 'e' at this time is expressed by the following Expression (4). According to Expression (4), the actuator operates not to follow-up RRO.

$$e = \frac{1}{1 + C(z) \cdot P(z)} (RRO + NRRO - RroTable) \quad (4)$$

$$= RPE + NRPE - \frac{1}{1 + C(z) \cdot P(z)} RroTable$$

Therefore to remove RPE from the position error 'e', an RroTable is generated so as to satisfy the following Expression (5).

$$RroTable = (1 + C(z) \cdot P(z)) RPE \quad (5)$$

In other words, as FIG. 38 shows, RPE is acquired from the position error 'e' by the acquisition block 110, and the RroTable value is determined from the acquired RPE through the reverse characteristics of the sensitivity function by the RRO calculation block 112. To determine the average value of a plurality of rotations of the disk, the addition block 114 adds the RroTable value of each rotation of the disk. FIG. 39 is an example of the frequency characteristic of the reverse characteristics of the sensitivity function, where the characteristics of gain and phase with respect to frequency are different.

In the case of the method for the actuator to follow-up RRO, on the other hand, a correction table 118 for storing a value of URroTable is created in advance, as shown in FIG. 40. And during the positioning control of the disk device, the URroTable value of the correction table 118 is added when a drive signal is supplied from the control system C(z) to the plant P(z). This URroTable value as well may be different depending on the head, track and read position/write position, or may have a value for each head and for each zone which is comprised of a plurality of tracks. Each head may have URroTable values regardless the track.

For this URroTable generation method as well, some methods have been proposed, such as a method of computing the position error 'e' and determining a signal that follows up RRO. An example of this computation method is a method of using a discrete Fourier transform (e.g. see Japanese Patent Application Laid-open No. H11-126444).

As FIG. 40 shows, the URroTable value is generated from the position error 'e', and RPE included in 'e' is removed. As mentioned above, the actuator operates so as to follow-up RRO, and the position error 'e' satisfies the following relational Expression (6) in a track following status where external vibration is not applied.

$$e = \frac{1}{1 + C(z) \cdot P(z)}(RRO + NRRO) + \frac{P(z)}{1 + C(z) \cdot P(z)}URroTable \quad (6)$$
$$= RPE + NRPE + \frac{P(z)}{1 + C(z) \cdot P(z)}URroTable$$

Therefore in order to remove RPE from the position error 'e', a URroTable value is generated so as to satisfy the following Expression (7). Expression (7) indicates that the URroTable value is determined from RPE through the transfer function that has a reverse characteristic of the sensitivity function and the reverse characteristic of the plant.

$$URroTable = -\frac{1 + C(z) \cdot P(z)}{P(z)}RPE \quad (7)$$

In other words, as FIG. 40 shows, RPE is acquired from the position error 'e' by the acquisition block 110, and the URroTable value is determined from the acquired RPE through the reverse characteristic of the sensitivity function and the reverse characteristic of the plant by the URRO calculation block 112. If an average value of a plurality of rotations of the disk is determined, the URroTable value of each rotation of the disk is added by the addition block 116.

As described above, a method of determining the correction table RroTable or URroTable from the observed RPE is to convert by such a transfer function as $(1+C(z) \cdot P(z))$ or $-(1+C(z) \cdot P(z))/P(z)$. For this conversion method, a method of determining the frequency characteristic between RPE and Pro or URRO in advance and using a discrete Fourier transform (DFT) is best to determine waveforms most accurately in a short time. Now this method will be described. First DFT is performed on the RPE waveform which was observed first. The number of servo sectors in one rotation is assumed to be Ns.

The RRO degree that must be considered in this case is 1 to (Nx/2−1) according to the sampling theorem. To perform DFT for the m degree of an RRO frequency when coefficients of m degree are expressed as C(m) and S(m), one rotation of RPE waveforms from sector No. 0 to No. (Ns−1) are multiplied by the m degree of a cosine waveform and a sin waveform, and the results are added. Expressions to calculate the coefficients C(m) and S(m) are shown in the following Expression (8).

$$C(m) = \sum_{k=0}^{N_S-1}\{RPE(k) \cdot \cos(2\pi mk/N_S)\}(2/N_S) \quad (8)$$
$$S(m) = \sum_{k=0}^{N_S-1}\{RPE(k) \cdot \sin(2\pi mk/N_S)\}(2/N_S)$$

Then in order to determine RRO or URRO, a transfer function is multiplied for each RRO degree. The complex number of the m degree of an RRO frequency of the frequency characteristics to be multiplied is determined in advance as $a(m)+jb(m)$. Specifically, the complex number at the m degree of a frequency is determined from the transfer function shown by Expression (5) or Expression (7). By multiplying this characteristic, the m degree of a component can be expressed by Expression (9) as a complex number. In other words, C2(m) and S2(m) can be determined by C(m), S(m), a(m) and b(m).

$$C2(m) + jS2(m) = (C(m) + jS(m))(a(m) + jb(m)) \quad (9)$$
$$= (C(m)a(m) - S(m)b(m)) + j(C(m)b(m) + S(m)a(m))$$

Finally inverse DFT is performed to obtain the waveform to be determined. m degree of computation is performed from the first degree to the (Ns/2−1)th degree. When the RroTable is generated, the RRO waveform at the q-th sector, that is RRO(q) is determined by the following Expression (10) (the same expression is also used when a URroTable is generated).

$$RRO(q) = \sum_{m=1}^{N_S/2-1}\{C2(m)\cos(2\pi mq/N_S) + S2(m)\sin(2\pi mq/N_S)\} \quad (10)$$

Expression (10) need not be computed for all the RRO degrees. For example, in order to calculate RRO(q), which is a locus that follows up the 1-4$^{th}$ degree of RRO and does not follow up the 5$^{th}$ or higher degree of RRO, only the calculation for the 5$^{th}$ degree or higher is performed, without performing, that is ignoring calculation for the 1-4$^{th}$ degree, out of the above mentioned calculations.

In this way, in order to determine RRO or URRO, it is necessary to convert the time waveform RPE into frequency units by DFT in Expression (8), multiply by the transfer function on the frequency axis (reverse characteristic of sensitivity function) by Expression (9), and convert the multiplication result in frequency units in Expression (9) into time waveforms by inverse DFT of Expression (10).

Today track density is increasing and the further improvement of positioning accuracy is demanded along with demands for increases in storage capacity. In the conventional method of generating an RRO correction table, the RroTable or URrotable, of a disk device, Expressions (8), (9) and (10) must be calculated sequentially for each measurement track. Since this DFT and inverse DFT calculation include sine and cosine calculations, where processing to refer to the sine and cosine tables is included, this takes time, unlike a simple addition/subtraction and multiplication.

For example, Expressions (8), (9) and (10) are calculated with measuring one track rotation of data (RPE), but it is rare to use the MCU (Micro-Controller Unit), to be installed in a magnetic disk device of which the arithmetic processing speed is fast, to decrease cost. Therefore the measurement of the next rack must be waited until the calculation processing is over, which makes the RRO correction table creation time longer.

Also along with the recent improvements of track densities, sometimes it is necessary to acquire an RRO correction waveform and a URRO correction waveform by measuring them for each track. For example, in the case of a 2.5-inch magnetic disk, about 50,000 tracks are created on one side of the magnetic disk, because of the improvements of track densities. If the magnetic head being used is an MR head and a write induction head, where the read and write heads are separated, the positions of the heads are different between read and write, and two correction waveforms, one for reading and the other for writing, must be provided for one track. In other words, for one side of the magnetic disk, 100,000 tracks of measurement and calculation may be required. Also in the case of a device with two magnetic disks, that is four magnetic disk faces, 400,000 tracks of measurement and calculation are required.

As described above, the calculation amount for calculating RRO and URRO is large, the program size used for processing is also large, and load on the MCU is high. This makes the measurement time of the RPE required for satisfying the specifications of positioning accuracy, that is the time required for creating a correction table in the manufacturing steps, long, when correction values are measured in the manufacturing steps of a disk device, which is not appropriate for mass manufacturing of disk devices.

SUMMARY OF THE INVENTION

With the foregoing in view, it is an object of the present invention to provide a method of creating a correction table that decreases the computation load and satisfies the specifications of positioning accuracy in a shorter time when RRO and URRO, that is one of the correction values for the correction table, is calculated, and a head positioning control method and a disk device thereof.

It is another object of the present invention to provide a method for creating a correction table which decreases computing load and satisfies the specifications of positioning accuracy in a shorter time, even if a computation equivalent to DFT/inverse DFT is performed, when RRO or URRO, this is one of the correction values for the correction table, is calculated, and a head positioning control method and a disk device thereof.

It is still another object of the present invention to provide a correction table creation method for creating a correction table in a shorter time even if the correction values of many tracks are calculated when RRO or URRO, that is one of the correction values for the correction table, is calculated, and a head positioning control method and a disk device thereof.

To achieve the above objects, the correction table creation method of the present invention is a correction table creation method for head position control for creating correction signals for correcting the components synchronizing rotation of a disk. The method includes a step of measuring position error components synchronizing the rotation of the disk from an average waveform of a position error between a detection position based on a position signal from a head for at least reading the disk and a target position, a step of generating the correction signal from a filter function in time units, that is created from the measured frequency characteristics of a position control system of the head and repetition frequency of the rotation of the disk, and the measured position error component, and a step of storing the correction signals in the correction table.

The head position control method of the present invention is a head position control method for controlling a position of a head for at least reading information of a disk using signals where the position signals of the disk are corrected by components synchronizing rotation of the disk. The method includes a step of calculating a position error between a target position and a current position based on the position signal from the head, a step of reading a correction signal from a correction table for storing the correction signal acquired from a filter function in time units, that is created from the measured frequency characteristics of a position control system of the head and the repetition frequency of rotation of the disk, and the measured position error component synchronizing rotation of the disk, and a step of controlling the head position based on the position error and the correction signal.

The disk device of the present invention includes a head for at least reading information of a disk, an actuator for moving the head to a desired position on the disk, a correction table for storing correction signals acquired from a filter function in time units, that is created from the measured frequency characteristics of a position control system of the head and the repetition frequency of rotation of the disk, and the measured position error component synchronizing rotation of the disk, and a control unit for calculating a position error between a target position and a current position based on the position signals from the head and controlling the head position based on the position error and the correction signal.

In the present invention, it is preferable that the generation step further includes a step of generating the correction signal using a part of the created filter function in time units.

In the present invention, it is preferable that the generation step further includes a step of generating the correction signal RRO by the filter function in time unit F(x) defined by the following Expression (13), where RPE is an average waveform of the position error signal, RRO is a correction signal, Ns is a number of servo sectors of one rotation of a track of the disk, and a(m)+jb(m) is the frequency characteristics, that is m times of the rotation frequency of the disk.

$$RRO(q) = \sum_{k=0}^{N_S-1} RPE(k)F(k-q) \quad (13)$$

$$F(x) = \sum_{m=1}^{N_S/2-1} \{a(m)\cos(2\pi mx/N_S) - b(m)\sin(2\pi mx/N_S)\}(2/N_S)$$

In the present invention, it is preferable that the generation step further includes a step of generating the correction signal RRO by the filter function in time unit F(x) defined by the following expression (37), where RPE is an average waveform of the position error signal, RRO is a correction signal, Ns is a number of servo sectors of one cycle of a track of the disk, a(m)+jb(m) is the frequency characteristics, that is m times of the rotation frequency of the disk, and Krro(m) is an additional gain of the correction table.

$$F(x) = \sum_{m=1}^{N_S/2-1} \{a(m)\cos(2\pi mx/N_S) - b(m)\sin(2\pi mx/N_S)\}Krro(m) \quad (37)$$

$$x = 0, 1, \ldots, (N_S - 1)$$

It is preferable that the present invention further includes a step of measuring the frequency characteristics of the position control system of the head and creating the filter function in time units from the measured frequency characteristics and the repetition frequency of the rotation of the disk.

In the present invention, it is preferable that the filter function creation step further includes a step of applying the sine disturbance to the position control system and observing the signal of the position control system, a step of computing the position error synchronizing the rotation of the disk from the observed signal, and a step of calculating the ratio of the disturbance and the position error in frequency units and calculating the frequency characteristics of the position control system of the head.

In the present invention, the sine and cosine terms of DFT and the inverse DFT are integrated, and complex numbers a(m) and b(m), which are m degrees of the RRO frequencies having frequency characteristics to be multiplied (1+C(z)·

P(z)) or −(1+C(z)·P(z))/P(z)) and sine and cosine for frequency conversion, are multiplied to create the filter function, and this filter function is used, so the correction values of the correction table can be calculated in time units without frequency conversion. This filter function F(x) takes a form of a filter targeting only the frequency fluctuation which appear repeatedly, and a(m) and b(m) are the frequency characteristics of the sensitivity function, so these can be measured and determined in advance, and a same values can be used for a same model. Therefore the value of the filter function F(x) can be calculated in advance, and when the RRO correction table is created, RRO(q) can be calculated using this filter function F(x) without frequency conversion.

BRIEF DESCRIPTION OF THE DRAWINGS

FIG. 8 is a flow chart depicting the filter function F(x) table creation processing in FIG. 7;

FIG. 9 is a flow chart depicting the RRO correction table creation processing in FIG. 7;

DESCRIPTION OF THE PREFERRED EMBODIMENTS

Embodiments of the present invention will now be described in the sequence of disk device, first embodiment of the RRO correction table creation method, second embodiment of the RRO correction table creation method, third embodiment of the RRO correction table creation method, fourth embodiment of the RRO correction table creation method, URRO correction table creation method, fifth embodiment of the RRO correction table, servo track write method using the RRO correction table, and other embodiments. The present invention, however, is not limited to the following embodiments.

Disk Device

Figure 1:
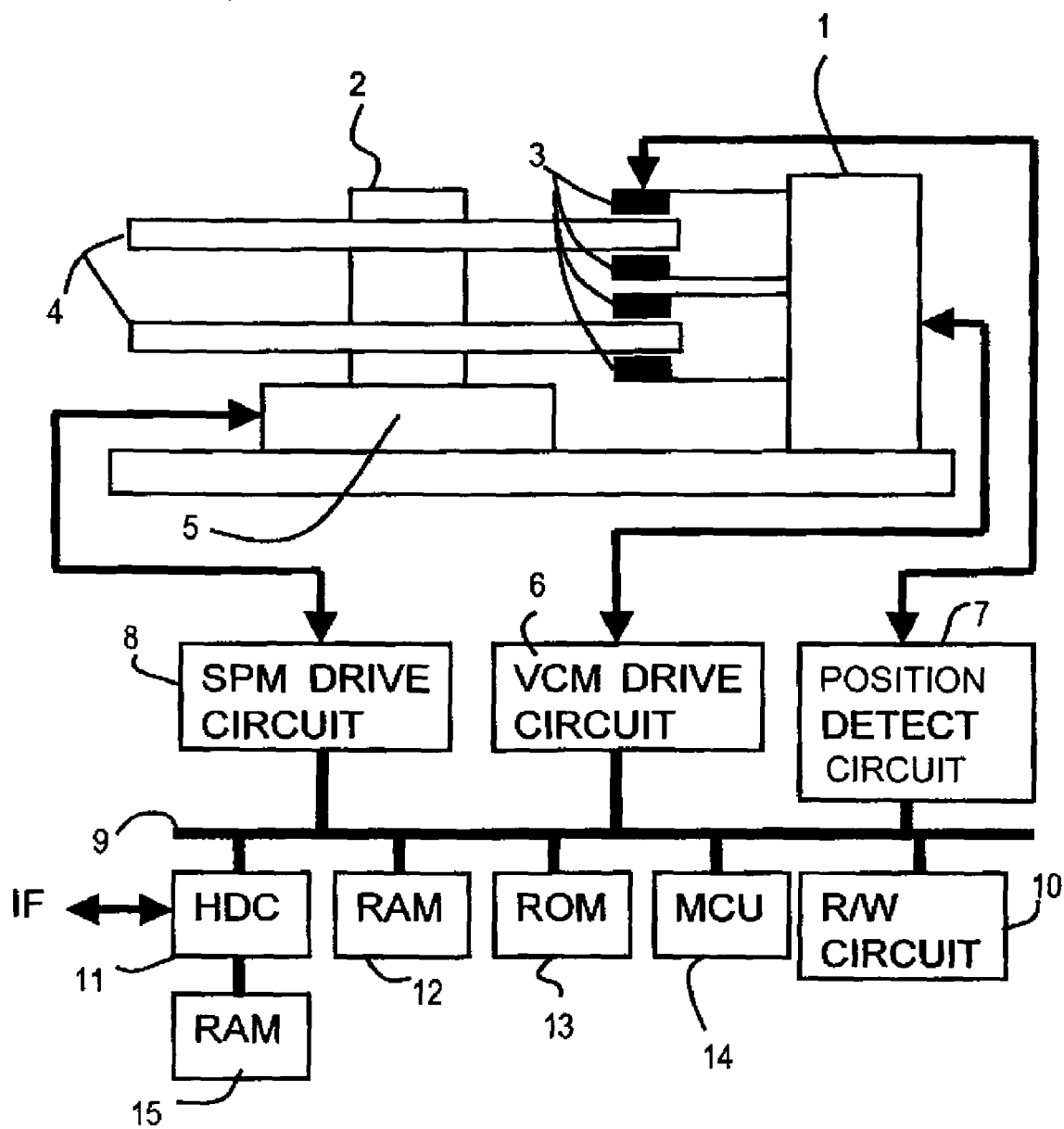
FIG. 1 is a diagram depicting a configuration of an embodiment of the disk device according to the present invention.
Figure 2:
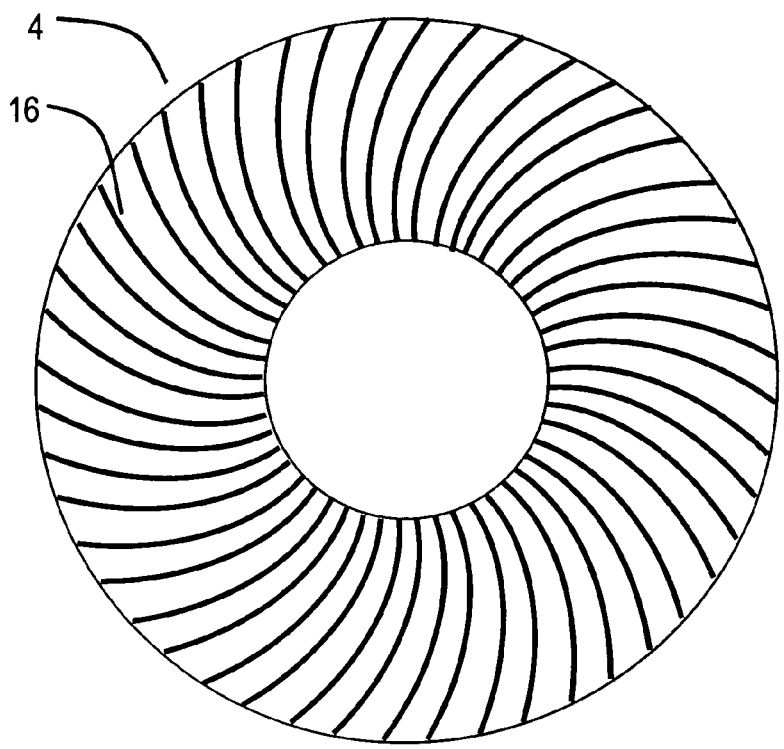
FIG. 2 is a diagram depicting the arrangement of the servo signals of the disk in FIG. 1.
Figure 3:
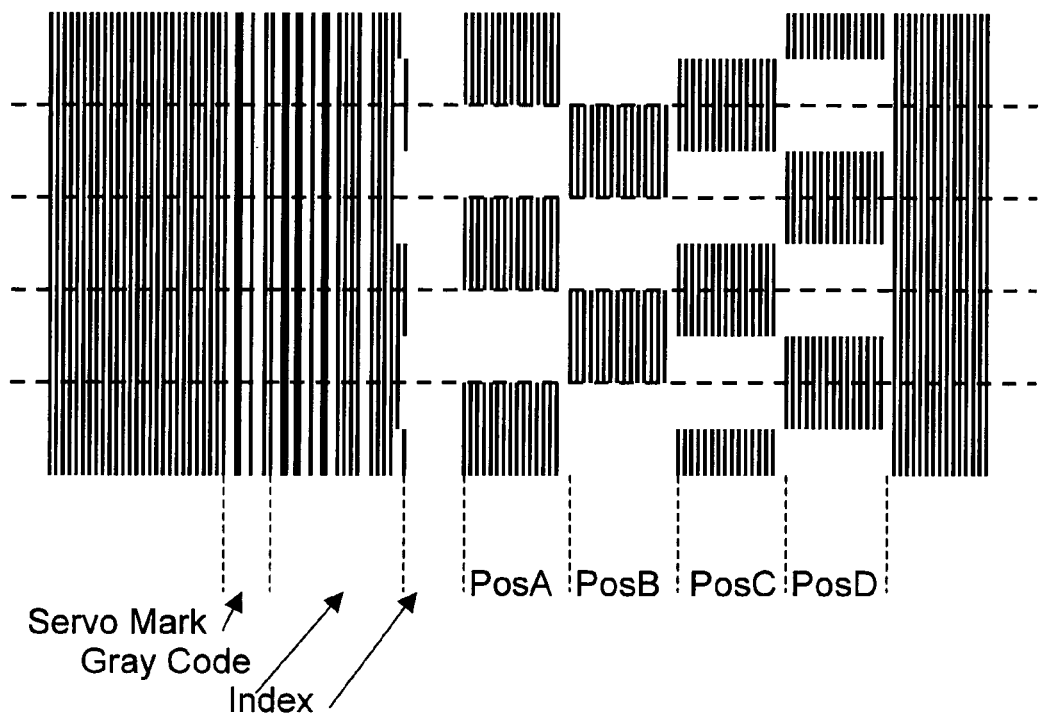
FIG. 3 is a diagram depicting the configuration of the servo signal in FIG. 2.
Figure 4:
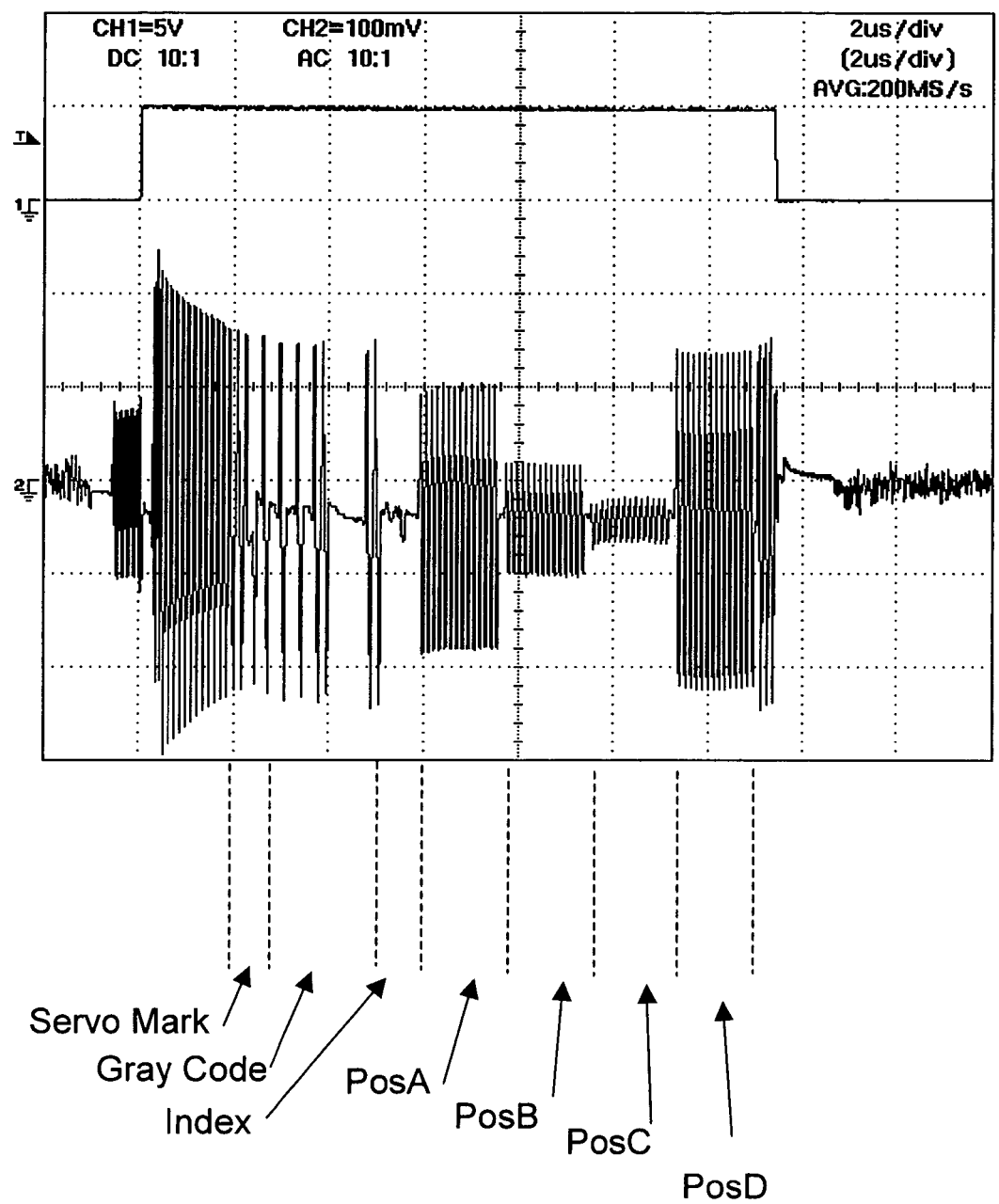
FIG. 4 is a read waveform diagram of the servo signal in FIG. 3.
Figure 5:
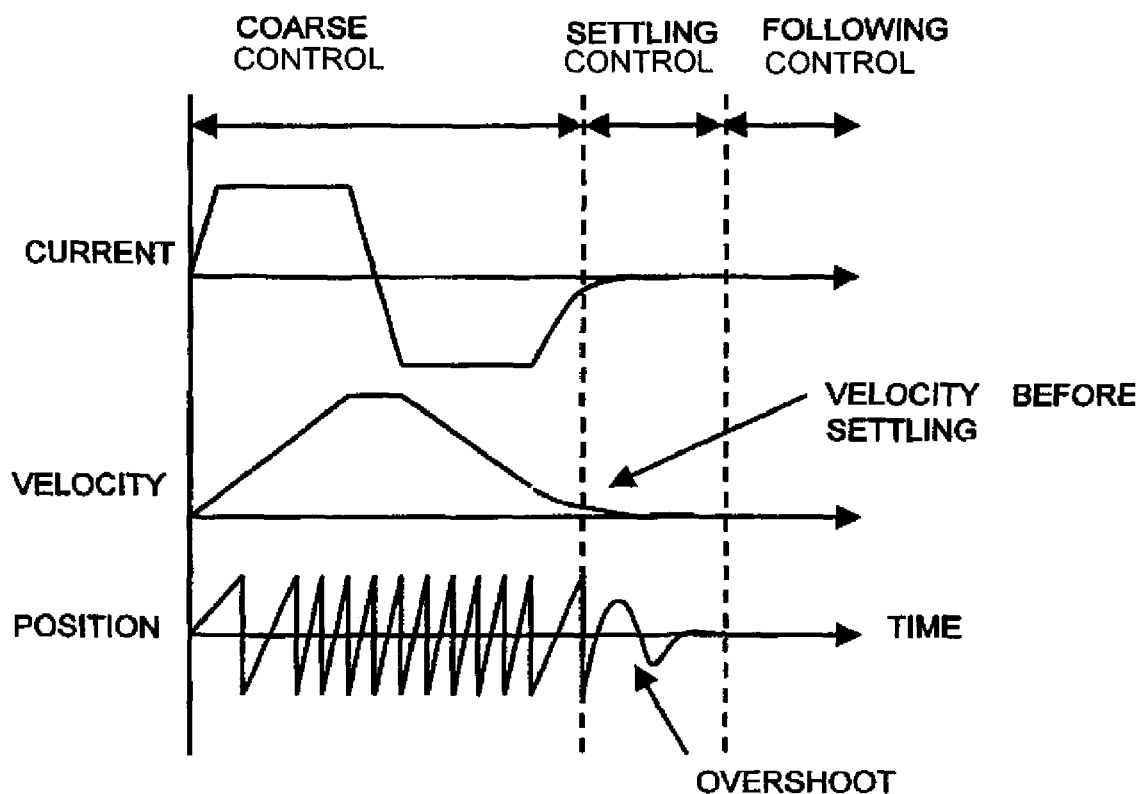
FIG. 5 is a diagram depicting the head control sequence in FIG. 1.
Figure 6:
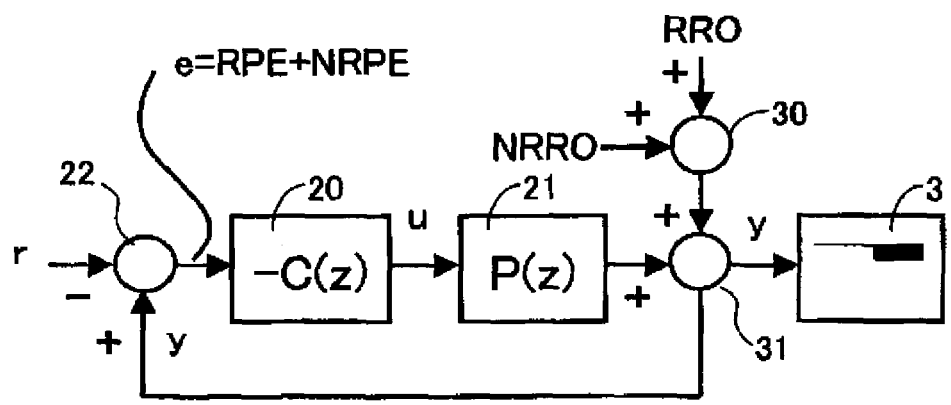
FIG. 6 is a block diagram depicting the servo control system in FIG. 1.

FIG. 1 is a diagram depicting a configuration of a disk storage device according to an embodiment of the present invention, FIG. 2 is a diagram depicting the arrangement of the position signals of the magnetic disk in FIG. 1, FIG. 3 is a diagram depicting the configuration of the position signals of the magnetic disk in FIG. 1 and FIG. 2, FIG. 4 is a waveform diagram depicting the reading of the position signal in FIG. 3, FIG. 5 is a diagram depicting the head position control in FIG. 1, and FIG. 6 is a block diagram depicting the servo control system with the configuration in FIG. 1.

FIG. 1 to FIG. 6 show a magnetic disk device as the disk storage device. As FIG. 1 shows, the magnetic disk 4, which is a magnetic storage medium, is installed at the rotation axis 2 of the spindle motor 5. The spindle motor 5 rotates the magnetic disk 4. The actuator (VCM: Voice Coil Motor) 1 includes a magnetic head 3 at the top, and moves the magnetic head 3 in the radius direction of the magnetic disk 4.

The actuator 1 is comprised of a voice coil motor (VCM) that rotates around the rotation axis. In FIG. 1, two magnetic disks 4 are installed in the magnetic disk device, and four magnetic heads 3 are simultaneously driven by the same actuator 1. The magnetic head 3 is comprised of a read element and a write element. The magnetic head 3 is constructed by layering read elements, including a magneto-resistance (MR) element, on a slider, and layering write elements, including a write coil, thereon.

The position detection circuit 7 converts the position signals (analog signals) read by the magnetic head 3 into digital signals. The read/write (R/W) circuit 10 controls the reading and writing of the magnetic head 3. The spindle motor (SPM) drive circuit 8 drives the spindle motor 5. The voice coil motor (VCM) drive circuit 6 supplies drive current to the voice coil motor (VCM) 1 and drives the VCM 1.

The micro-controller (MCU) 14 detects (demodulates) the current position using the digital position signal from the position detection circuit 7, and calculates the VCM drive instruction value according to the position error between the detected current position and the target position. In other words, position demodulation and servo control are performed. The read only memory (ROM) 13 stores the control programs of the MCU 14. The random access memory (RAM) 12 stores data required for the processing of the MCU 14.

The hard disk controller (HDC) 11 judges the position of the head within one rotation based on the sector number of the servo signal, and records/regenerates data. The random access memory (RAM) 15 is used as a buffer memory, and temporarily stores the read data and write data. The HDC 11 communicates with the host via such an interface IF as ATA and SCSI. The bus 9 connects them.

As FIG. 2 shows, the servo signals (position signals) are arranged on each track in the circumference direction at an equal interval, from the outer track to the inner track. Each track is comprised of a plurality of sectors, and the solid line 16 in FIG. 2 shows the recorded positions of the servo signals. As FIG. 3 shows, a position signal is comprised of a servo mark ServoMark, track number GrayCode, index Index, and offset information (servo burst) PosA, PosB, PosC and PosD. The dotted line in FIG. 3 shows the track center.

FIG. 4 is a signal waveform diagram when the position signal in FIG. 3 is read by the head 3. The radius direction of the magnetic head 3 is detected by using the track number GrayCode and offset information PosA, PosB, PosC and PosD of the signal waveform shown in FIG. 4. Also based on the index signal Index, the position of the magnetic head in the circumference direction is known.

For example, the sector number when the index signal is detected is set to No0, and this number is incremented each time the servo signal is detected, and the sector number of each sector of a track is acquired. The sector number of the servo signal becomes a reference when data is recorded/regenerated. There is one index signal on a track. The sector number may be set instead of or along with the index signal.

FIG. 5 is an example of seek control of the actuator performed by the MCU 14 in FIG. 1. Through the position detection circuit 7 in FIG. 1, the MCU 14 confirms the position of the actuator 1, performs servo computation, and supplies an appropriate current to the VCM 1. FIG. 5 shows the transition of control from the start of seeking, when the head 3 is moved from a track position to the target track position, the electric current of the actuator 1, the speed of the actuator 1 (head 3) and the position of the actuator 1 (head 3).

In other words, in seek control, the head can be moved to the target position by coarse control, settlement control and following control. Coarse control is basically speed control, and settlement control and following control are basically position control, where the current position of the head must be detected for both. Transition from settlement control to following control, that is the completion of seek control, is judged based on RPE. Whether data can be recorded/regenerated during following control can also be judged based on RPE.

To confirm these positions, servo signals are recorded on the magnetic disk in advance, as shown in FIG. 2 to FIG. 4. In other words, as FIG. 3 shows, a servo mark, to indicate the start position of the servo signal, a gray code, to indicate the track number, an index signal, and signals PosA-PosD, to indicate offset, are recorded. This servo signal is read by the magnetic head 3, and the position detection circuit 7 converts this servo signal into a digital value.

The MCU 14 performs computation of the digital servo control system shown in FIG. 6. In other words, the error 'e' between the target position 'r' and the current position 'y' is determined by the computation block 22, and the controller 20 performs control computation, calculates the control amount and drives the VCM 1, that is the plant 21. For the position of the plant 21, the current position 'y' is acquired by demodulating the servo signal from the magnetic head 3. The difference between the current position 'y' and the target position 'r' becomes the position error 'e'.

In FIG. 6, the components synchronizing rotation of the spindle motor 5 and the components not synchronizing are denoted as RRO, NRRO, RPE and NRPE as the disturbances applied to the control system. RRO (Repeatable RunOut) are the components of the positional disturbance synchronizing rotation. NRRO (Non-Repeatable RunOut) are the components of the positional disturbance not synchronizing rotation. In the present invention, all disturbances are considered in position units. For example, the wind disturbance applied to the actuator 1 is expressed in acceleration units, but this is converted into position units here. RPE (Repeatable Position Error) are components synchronizing rotation included in the position error 'e' when positioning control is performed. NRPE (Non-Repeatable Position Error) are components not synchronizing rotation included in the position error 'e' when positioning control is performed. RRO and RPE show different values depending on the servo sector.

First Embodiment of RRO Correction Table Creation Method

Figure 7:
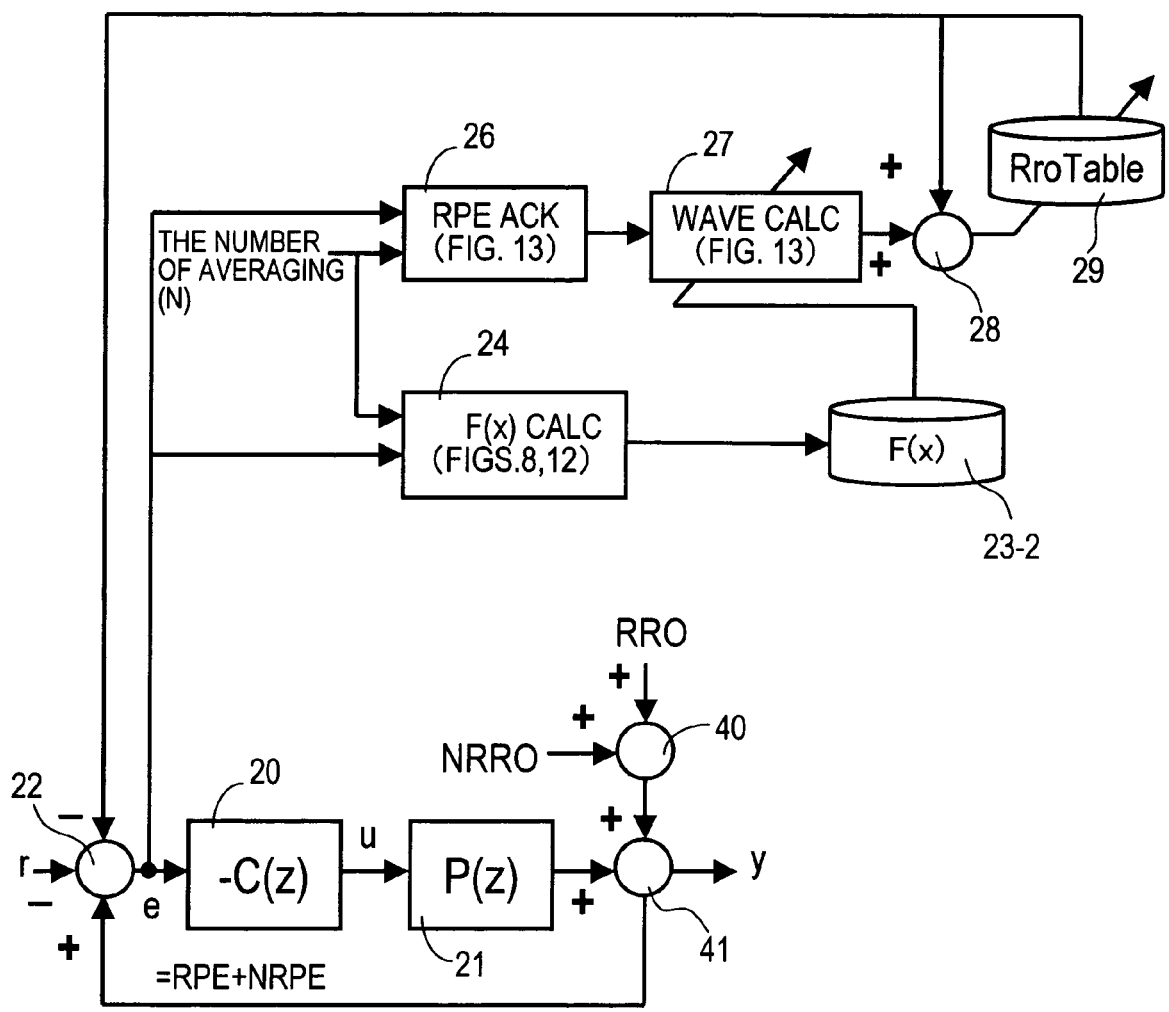
FIG. 7 is a block diagram depicting a servo control system having the RRO correction function according to an embodiment of the present invention.
Figures 10, 11:
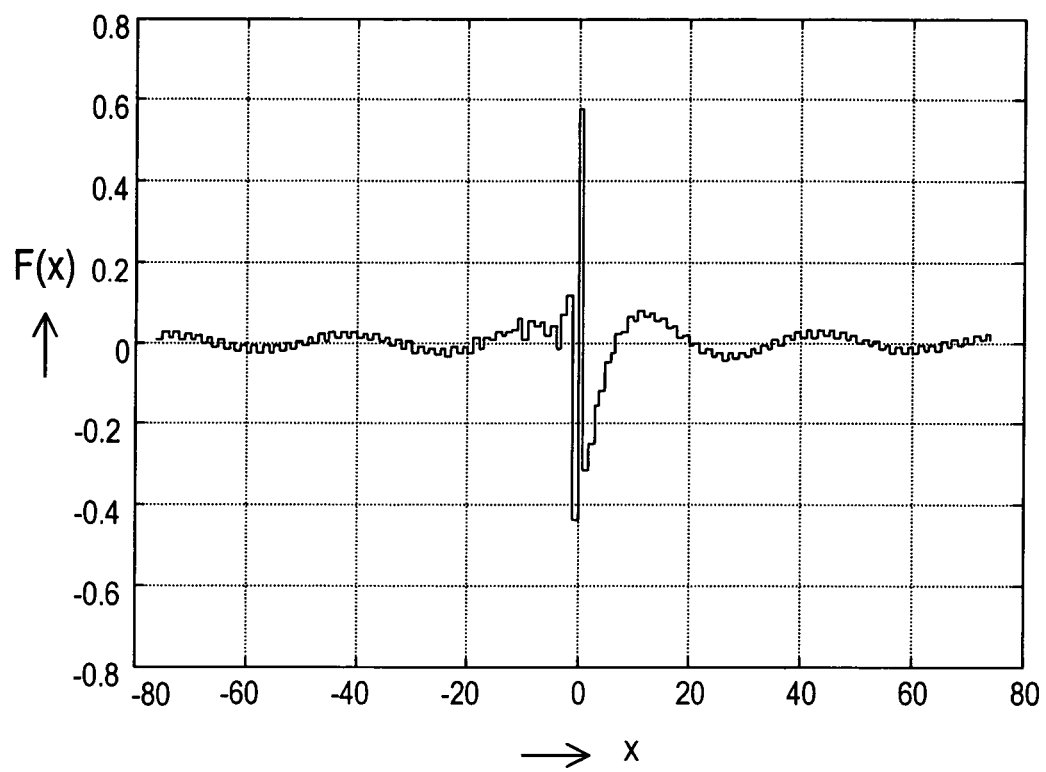
FIG. 10 is a graph depicting the array of the filter function F(x) created in FIG. 8.
FIG. 11 shows the F(x) table in FIG. 7.

FIG. 7 is a functional block diagram depicting the first embodiment of the RRO correction table creation method. FIG. 7 shows a block diagram in the case of calculating a filter function F(x) and creating the correction table by a single disk device. FIG. 8 is a flow chart depicting the filter function F(x) calculation processing in FIG. 7, FIG. 9 is a flow chart depicting the RRO table creation processing using the filter function F(x) in FIG. 8, FIG. 10 is a graph depicting the filter function F(x) created in FIG. 8, and FIG. 11 shows the F(x) table 23 in FIG. 7.

In FIG. 7, composing elements the same as those in FIG. 6 are denoted with the same reference numerals. In other words, the error 'e' between the target position 'r' and the current (observing) position 'y' is determined by the computation block 22, and the controller 20 performs control computation, calculates the control amount and drives the VCM 1, that is the plant 21. For the position of the plant 21, servo signals are demodulated from the magnetic head 3, and the current position 'y' is acquired. The difference between the current position 'y' and the target position 'r' becomes the position error 'e'. As the disturbances to be applied to this control system, components synchronizing rotation of the spindle motor 5 and components not synchronizing are shown as RRO, NRRO, RPE and NRPE.

Figure 13:
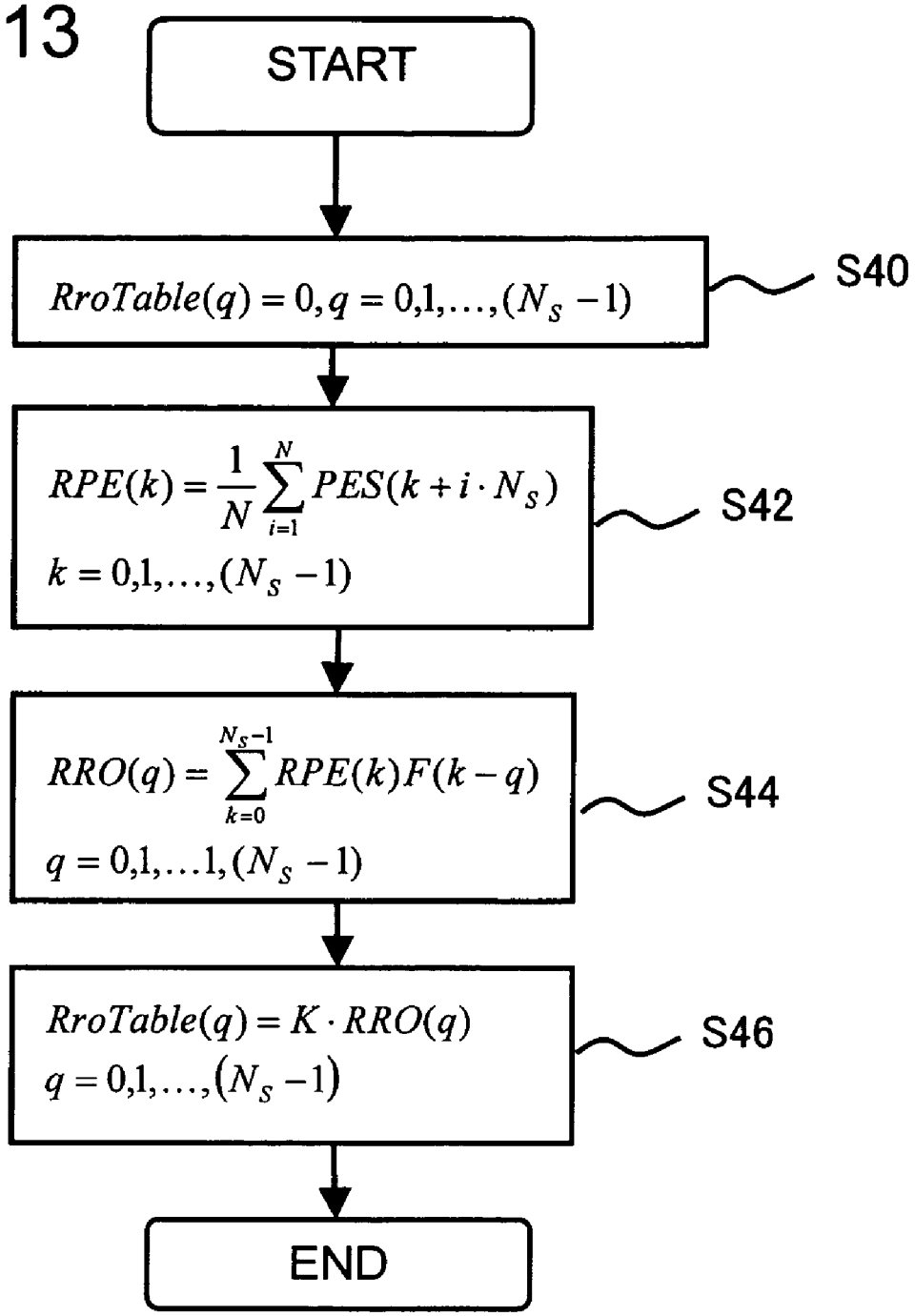
FIG. 13 is a flow chart depicting the RroTable creation processing in FIG. 9.

The RPE acquisition block 26 acquires RPE from the position error 'e' for each sector, as described in FIG. 9 and FIG. 13. The F(x) computation block 23-1 computes one filter function F(x) where a series of DFT computation and inverse DFT computation expressions are integrated based on the position error 'e'. The function F(x) table 23-2 stores the computed filter function F(x). The waveform calculation block 27 calculates the RRO waveform by multiplying the RPE acquired by the RPE acquisition block 26 by the filter function F(x), as described later in FIG. 9 and FIG. 13. The RRO table 29 stores the RRO waveform. The addition block 28 adds the RRO waveform for the number of repeats, and updates the table 29.

After creating the RRO table 29, the target position 'r' and the RroTable value of the correction table 29 are subtracted from the observing position 'y', and the position error 'e' is generated by the computation block 22 in the magnetic disk device operating status (particularly in the following status). By this, RRO correction is performed for the input 'e' to the controller 20.

First the filter function F(x) will be described. In order to determine RroTable or URroTable, the average waveform of the position error 'e' must be multiplied by $(1+C(z)\cdot P(z))$ or $-(1+C(z)\cdot P(z))/P(z)$. DFT computation is required in order to compute accurately. Specifically, DFT computation is performed on the determined RPE waveform (time units), to convert into frequency units, $(1+C(z)\cdot P(z))$ or $-(1+C(z)\cdot P(z))/P(z)$ is multiplied for each RPE degree of frequency, and finally inverse DFT computation is performed to determine the estimated RRO waveform. The series of DFT computation and inverse DFT computation expressions are integrated into one expression. The method for deriving this expression will now be described. Let us assume that DFT computation is performed for m degrees of RRO frequencies. For example, in the case of a device with 4200 rpm, one degree of an RRO frequency is 70 Hz. As described above, if the m degree of coefficient of cosine and sine are expressed as C(m) and S(m) respectively, then the coefficient of DFT with the m degree of RRO frequency can be determined by the above mentioned Expression (8).

Then the complex values of the m degree of the frequency of the frequency characteristics to be multiplied $(1+C(z)\cdot P(z))$ or $-(1+C(z)\cdot P(z))/P(z))$ are assumed to be $a(m)+jb(m)$. When these characteristics are multiplied, the m degree of components can be given by the above-mentioned Expression (9) using the complex values.

Then the Expression (8) is substituted in Expression (9), and C2(m) and S2(m) are determined by the following Expression (11).

$$C2(m) = C(m)a(m) - S(m)b(m) \quad (11)$$

$$= a(m)\sum_{k=0}^{N_S-1}\{RPE(k)\cdot\cos(2\pi mk/N_S)\}(2/N_S) -$$

$$b(m)\sum_{k=0}^{N_S-1}\{RPE(k)\cdot\sin(2\pi mk/N_S)\}(2/N_S)$$

$$= \sum_{k=0}^{N_S-1}\{RPE(k)(a(m)\cos(2\pi mk/N_S) - b(m)\sin(2\pi mk/N_S))\}(2/N_S)$$

-continued $$S2(m) = C(m)b(m) + S(m)a(m)$$

$$= b(m)\sum_{k=0}^{N_S-1}\{RPE(k)\cdot\cos(2\pi mk/N_S)\}(2/N_S) +$$

$$a(m)\sum_{k=0}^{N_S-1}\{RPE(k)\cdot\sin(2\pi mk/N_S)\}(2/N_S)$$

$$= \sum_{k=0}^{N_S-1}\{RPE(k)(b(m)\cos(2\pi mk/N_S) + a(m)\sin(2\pi mk/N_S))\}(2/N_S)$$

This m degree of computation is performed from one degree to (Ns/2) degrees (Ns is the number of servo sectors in one rotation), and the waveform to be determined is acquired by inverse DFT computation. When the RroTable is generated, the RRO waveform q-th sector: RRO (q) is determined by the following Expression (12) (the same form is used for generating the URroTable).

$$RRO(q) = \sum_{m=1}^{N_S/2-1}\{C2(m)\cos(2\pi mq/N_S) + S2(m)\sin(2\pi mq/N_S)\} \quad (12)$$

$$= \sum_{m=1}^{N_S/2-1}\sum_{k=0}^{N_S-1} RPE(k)\{a(m)\cos(2\pi mk/N_S)\cos(2\pi mq/N_S) -$$

$$b(m)\sin(2\pi mk/N_S)\cos(2\pi mq/N_S) +$$

$$b(m)\cos(2\pi mk/N_S)\sin(2\pi mq/N_s) +$$

$$a(m)\sin(2\pi mk/N_S)\sin(2\pi mq/N_S)\}(2/N_S)$$

$$= \sum_{m=1}^{N_S/2-1}\sum_{k=0}^{N_S-1} RPE(k)[a(m)\{\cos(2\pi mk/N_S)\cos(2\pi mq/N_S) +$$

$$\sin(2\pi mk/N_S)\sin(2\pi mq/N_S)\} + b(m)\{-$$

$$\sin(2\pi mk/N_S)\cos(2\pi mq/N_S) +$$

$$\cos(2\pi mk/N_S)\sin(2\pi mq/N_S)\}](2/N_S)$$

$$= \sum_{m=1}^{N_S/2-1}\sum_{k=0}^{N_S-1} RPE(k)\{a(m)\cos(2\pi m(k-q)/N_S) -$$

$$b(m)\sin(2\pi m(k-q)/N_S)\}(2/N_S)$$

$$= \sum_{k=0}^{N_S-1} RPE(k)\sum_{m=1}^{N_S/2-1}\{a(m)\cos(2\pi m(k-q)/N_S) -$$

$$b(m)\sin(2\pi m(k-q)/N_S)\}(2/N_S)$$

Here the next terms of the term RPE(k) in the Expression (12) are integrated into F(x), and the Expression (13) is acquired. This F(x) is an array having Ns, which is the number of sectors in one rotation, number of coefficients.

$$RRO(q) = \sum_{k=0}^{N_S-1} RPE(k)\cdot F(k-q) \quad (13)$$

$$F(x) = \sum_{m=1}^{N_S/2-1}\{a(m)\cos(2\pi mx/N_S) - b(m)\sin(2\pi mx/N_S)\}(2/N_S)$$

In other words, when the expression is transformed as Expression (12), the sine and cosine terms of DFT and inverse DFT can be integrated, and when the (frequency) filter function F(x) is used as in Expression (13), the expression of RRO(q) is expressed in time units. This filter function F(x) is the multiplication of the complex values a(m) and b(m) of the m degree of the RRO frequency of the frequency characteristics to be multiplied, that is (1+C(z)·P(z)) or –(1+C(z)·P(z))/P(z)), and the sine and cosine for frequency conversion.

Therefore when the filter function F(x) is calculated by measurement in advance, the RRO correction value RRO(q) can be calculated in time units without frequency conversion. This filter function F(x) takes the form of a filter targeting only the frequency fluctuation which appears repeatedly, as shown in Expression (13), and since a(m) and b(m) are the frequency characteristics of the sensitivity function, they can be determined by measurement in advance, as described later, and the same values can be used for a same model.

Therefore the value of the filter function F(x) can be calculated in advance, and when the RRO correction table is created, RRO(q) can be calculated using the value of this filter function F(x) without frequency conversion.

The filter function F(x) satisfies the relationship in Expression (14). In other words, F(x) becomes a same value in each track for the Ns number of sectors.

$$F(x)=F(x+N_S)=F(x-N_S) \tag{14}$$

Using Expression (14) as an element, the waveform of the fifth sector: RRO (5), for example, can be calculated by the following Expression (15).

$$RRO(5)=RPE(0)F(-5)+RPE(1)F(-4)+\ldots+RPE(N_S-1)F(N_S-6) \tag{15}$$

FIG. 10 is an example of F(x), which is an array of the Ns number, which is the number of sectors of one rotation, of coefficients. In FIG. 10, the abscissa is x (number of sectors Ns) and the ordinate is the filter function value F(x). FIG. 11 shows the created F(x) table 23-2. In other words, the coefficient value F(x) of the filter function F(x) with respect to each abscissa x is stored. As Expression (14) shows, a plurality of rotations of F(x) can be used by using one rotation of F(x).

Now processing to determine this function F(x) will be described. First just like Expression (9) for DFT computation, the frequency characteristics a(m) and b(m) of the positioning loop of Expression (13) of the filter function F(x) are determined. This is only for a representative disk drive, and measurement is performed at the inner position, center position and outer position for each head.

FIG. 8 is a flow chart depicting the processing of the F(x) computation block 23-1 in FIG. 7.

(S10) The frequency characteristics a(m) and b(m) (see Expressions (11) to (13)) of a representative model of a magnetic disk device are measured. Details will be described later in FIG. 12.

(S12) Using the measured frequency characteristics a(m) and b(m), the filter function F(x) is calculated by Expression (13).

(S14) The calculated filter function F(x) is stored in the F(x) table 23-2.

FIG. 9 is a flow chart depicting the processing of the RPE acquisition block 26 and the waveform calculation block 27 in FIG. 7.

Figure 12:
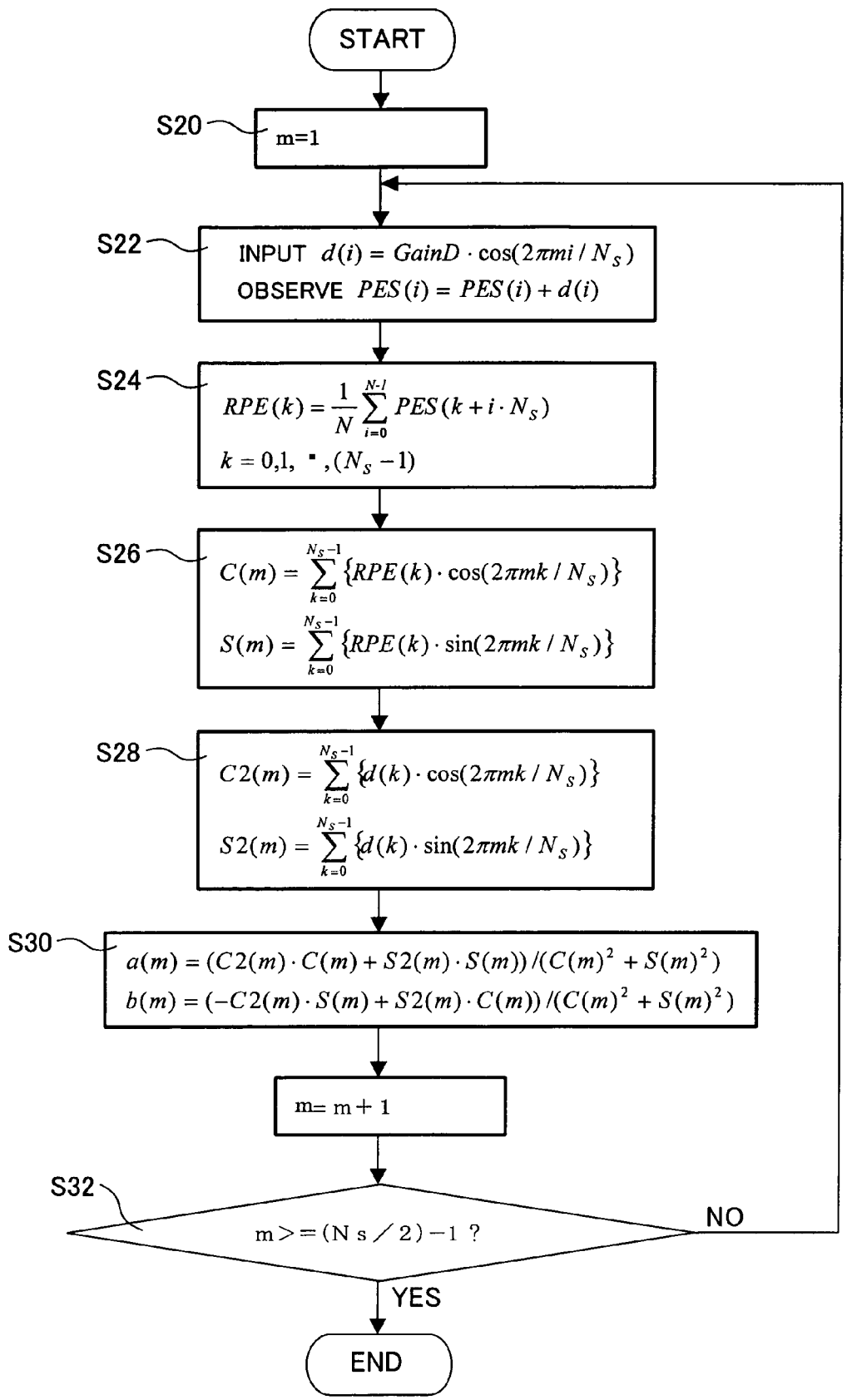
FIG. 12 is a flow chart depicting the measurement and calculation processing of the complex values of the m degrees of RRO frequencies of the DFT filter function F(x) in FIG. 8.

(S16) RPE of each sector is measured. As FIG. 12 shows, RPE(k) of each sector is determined by the average value of the position error PES.

(S18) When the RPE of all the sectors in one rotation are measured, the function values of all the sectors are determined referring to the F(x) table 23-2, and the RRO waveform RRO(q) is calculated by Expression (13).

The above mentioned frequency characteristic measurement processing will be described. FIG. 12 is a flow chart depicting the frequency characteristic measurement processing of a positioning loop.

(S20) RRO degree m is initialized to "1".

(S22) During positioning control by the control system in FIG. 7, the sine wave disturbance d(i)=Gain D·cosine (2πmi/Nc) of the position is input to the observing position (output of the computation block 41 in FIG. 7), and the position error PES (i) is measured after a predetermined time has elapsed. Here Gain D is set to the amplitude with which the position fluctuates for several tracks.

(S24) The position error PES (k+i·Ns) of each sector k for all the n rotations of the magnetic disk 4 is measured, and the average value RPE(k) of the position error PES of each sector k is calculated. In other words, here it is assumed that the pointer of the sector is k, the number of servo sectors in one rotation is Ns, and i is the number of rotations (first cycle, second cycle, . . . Nth cycle). Therefore in the expression in FIG. 12, the sum of the position error of each rotation of a same sector as the sector pointer k, that is PES (k+i·Ns), is determined, and divided by the number of measurement rotations N so as to obtain the average. By this, the influence of noise at the observing position is removed.

(S26) Then DFT is performed for the RPE waveform RPE (k) that was observed first. If the number of servo sectors in one rotation is Ns, the RRO degree that must be considered is 1–(Ns/2-1) according to the sampling theorem. To perform DFT for the m degree of the RPE waveform frequency, the m degree of the coefficients of cosine and sine are expressed as C(m) and S(m) respectively, and one rotation of the RPE waveform from sector No. 0 to NO. (Ns–1) is multiplied by the m degree of the cosine waveform and sine waveform, and the results are added. In other words, the following Expression (16) is calculated.

$$C(m) = \sum_{k=0}^{N_S-1} \{RPE(k) \cdot \cos(2\pi mk / N_S)\} \tag{16}$$

$$S(m) = \sum_{k=0}^{N_S-1} \{RPE(k) \cdot \sin(2\pi mk / N_S)\}$$

Then DFT is performed for the waveform of the sine disturbance d(k) that was input in step S22. In other words, the complex values C2(m)+j·S2(m) of the disturbance is obtained by multiplying the m degree of the cosine waveform and sine waveform to the sine disturbance for one rotation from the sector No. 0 to No. (Ns–1), and adding the results. In other words, the following Expression (17) is calculated.

$$C2(m) = \sum_{k=0}^{N_S-1} \{d(k) \cdot \cos(2\pi mk / N_S)\} \tag{17}$$

$$S2(m) = \sum_{k=0}^{N_S-1} \{d(k) \cdot \sin(2\pi mk / N_S)\}$$

(S30) Since the frequency characteristic is acquired by (disturbance)/(position after disturbance addition), the division result is acquired by the following Expression (18).

$$\frac{C2(m) + jS2(m)}{C(m) + jS(m)} = \frac{C2(m) + jS2(m)}{C(m)^2 + S(m)^2}(C(m) - jS(m)) \quad (18)$$

$$= \frac{C2(m) \cdot C(m) + S2(m) \cdot S(m)}{C(m)^2 + S(m)^2} +$$

$$j\frac{-C2(m) \cdot S(m) + S2(m) \cdot C(m)}{C(m)^2 + S(m)^2}$$

$$= a(m) + jb(m)$$

When this is expressed by the frequency characteristics a(m) and b(m), the following Expression (19) is obtained, and a(m) and b(m) can be acquired by calculating this expression. And the degree m is incremented "1".

$$a(m) = (C2(m) \cdot C(m) + S2(m) \cdot S(m))/(C(m)^2 + S(m)^2)$$

$$b(m) = (-C2(m) \cdot S(m) + S2(m) \cdot C(m))/(C(m)^2 + S(m)^2) \quad (19)$$

(S32) Since the m degree is up to (Ns/2)−1 according to the above mentioned sampling theorem, it is judged whether the degree m is (Ns/2−1) or more. If the degree m is not (Ns/2−1) or more, processing returns to step S22. If the degree m is (Ns/2−1) or more, processing ends.

In this way the reverse characteristic (frequency characteristics) of the sensitive function, a(m) and b(m) are measured in advance using a representative disk drive. And using the frequency characteristics, the filter function F(x) is calculated by Expression (13).

The correction table creation processing using this filter function F(x) will now be described with reference to FIG. 13.

(S40) First the RRO correction value of each sector q of the correction table 29, that is RroTable(q), is initialized to "0". q is a value in a 0−(Ns−1) range. In other words, the number of servo sectors in one rotation is Ns.

(S42) Just like step S24 in FIG. 12, the position error PES (k+i·Ns) of each sector pointer k of all the N rotations of the magnetic disk 4 is measured, and the average value RPE (k) of the position error PES of each sector pointer k is calculated. In other words, here it is assumed that the pointer of the sector is k, the number of servo sectors in one rotation is Ns, and i is the number of rotations (first cycle, second cycle, . . . Nth cycle). Therefore in the expression in FIG. 13, the sum of the position error of each rotation of a same sector k, that is PES (k+i·Ns), is determined, and is divided by the number of measurement rotations N so as to obtain an average. The average value RPE(k) of the position error PES of all the sector pointers k is calculated.

(S44) To calculate RRO(q) of the target sector q, RRO(q) is calculated using the filter function F(k−q) of the F(x) table 23-2 and the average value RPE(k), while changing the sector pointer k from "0" to "Ns−1". In other words, when the RroTable is generated, the RRO waveform at the q-th sector: RRO(q) is determined by the following Expression (20). (The same expression is also used for generating the later mentioned URroTable.)

$$RRO(q) = \sum_{k=0}^{N_S-1} RPE(k) \cdot F(k-q) \quad (20)$$

$$q = 0, 1, \ldots 1, (N_S - 1)$$

(S46) Finally the determined RRO(q) is multiplied by the above mentioned optimum gain k, and the result is stored in the RroTable(q) of the correction table 29. And processing ends.

If the number of times of measurement and correction M is 2 or more, this step is repeated, and the result is added to the value in the correction table 29 by the block 28, and the result is stored in the correction table 29.

When the above mentioned filter function is used, a series of RRO generation computing processing can be performed by a simple expression without multiplying sine and cosine. Conventionally when the MCU performs calculation, the values of sine and cosine are provided as a table in advance, and the table is referred to each time the correction table is calculated. Therefore this reference processing takes time. By determining the filter function F(x) for a representative model by measurement and calculation in advance and using this for other disk devices, load of the MCU for creating the RRO table 29 in another disk device decreases, and processing time can be decreased.

Now an example of RRO correction table creation processing, written in C programming language, is shown. When the average value RPE is already measured, the program for calculating RRO of the above Expression (13) becomes as follows, which is extremely simple. RPE, RRO and F indicate the above-mentioned average value of the position error, the RRO correction value and filter function, and RPE, RRO, F, and KBitShiftF are external variables. Since this is expressed by a fixed point, the number of bits of KBitShiftF is a decimal point or less of the function value stored in array F.

```
void calcRro(void) [
    for (int q=0; q<= Ns-1; q++) [
        RRO(q)=0;
    for (int k=0; k<= Ns-1; k++) [
        int Idx = k-q;
        if (Idx < 0)      Idx +=Ns;
        RRO(q) += RPE(k)*F(Idx);
        ]
        RRO(q) >>= (kBitShiftF);
    ]
]
```

Second Embodiment of RRO Correction Table Creation Method

Figure 14:
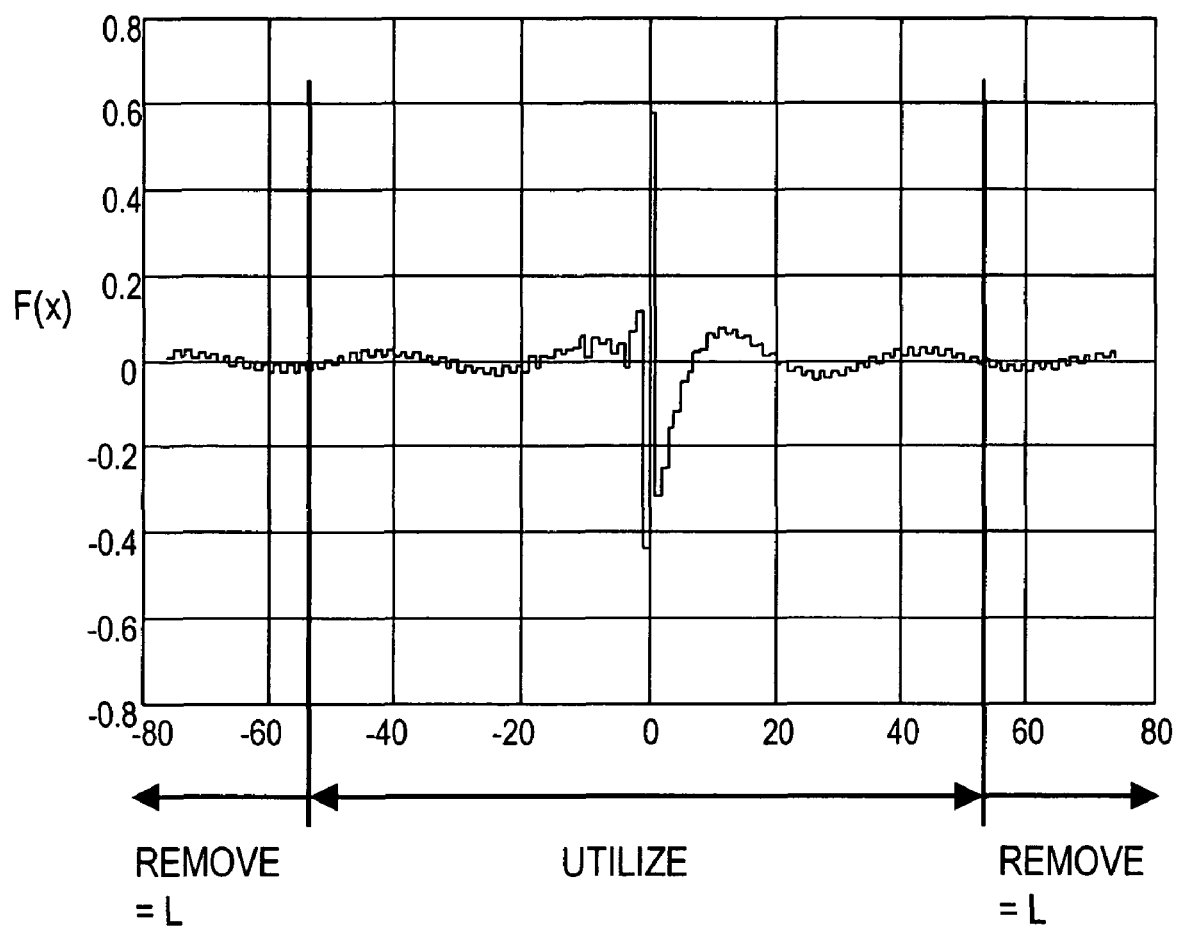
FIG. 14 is a graph depicting the RroTable creation method according to the second embodiment of the present invention.
Figure 15:
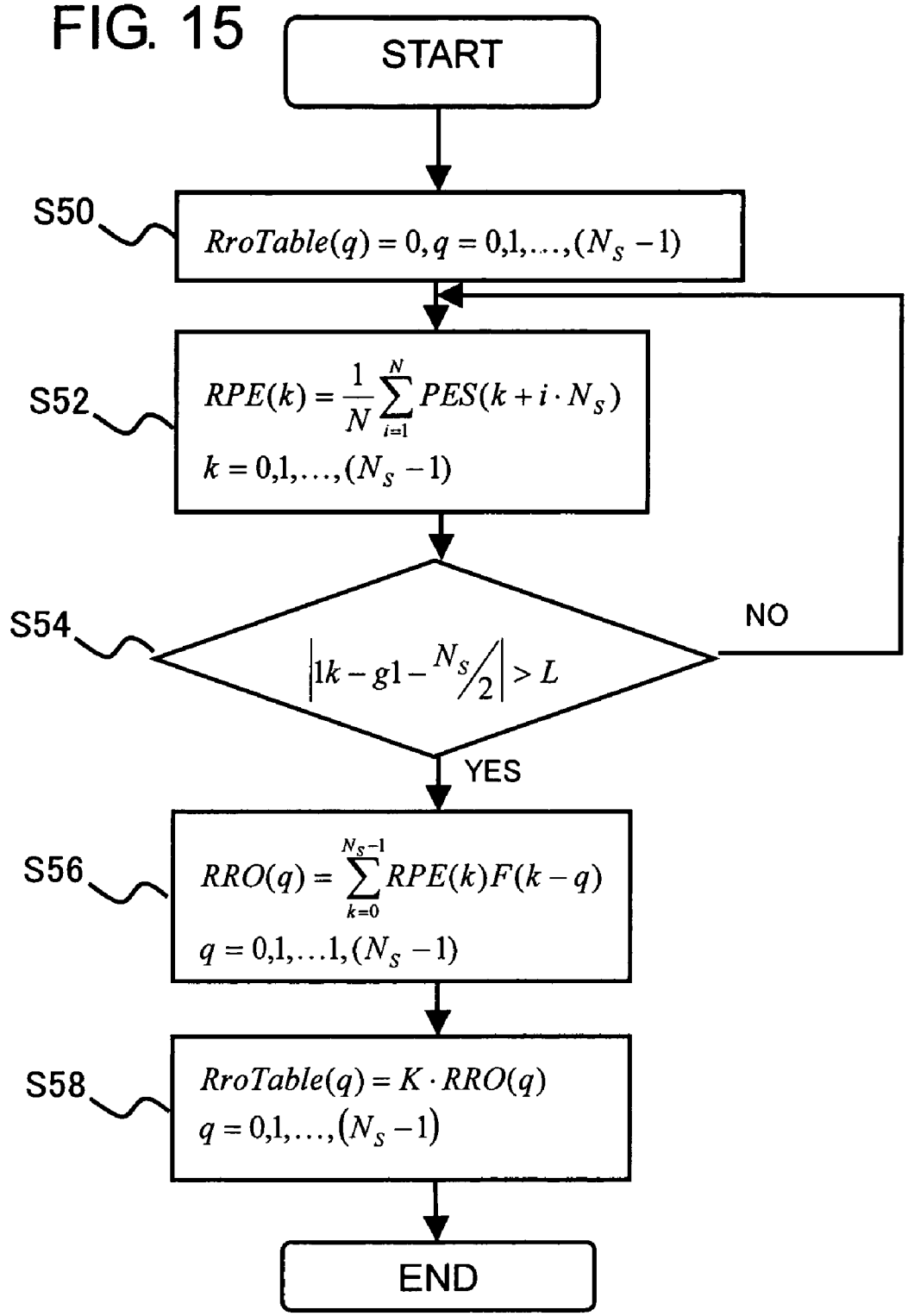
FIG. 15 is a flow chart depicting the RroTable creation processing according to the second embodiment in FIG. 13.
Figure 16:
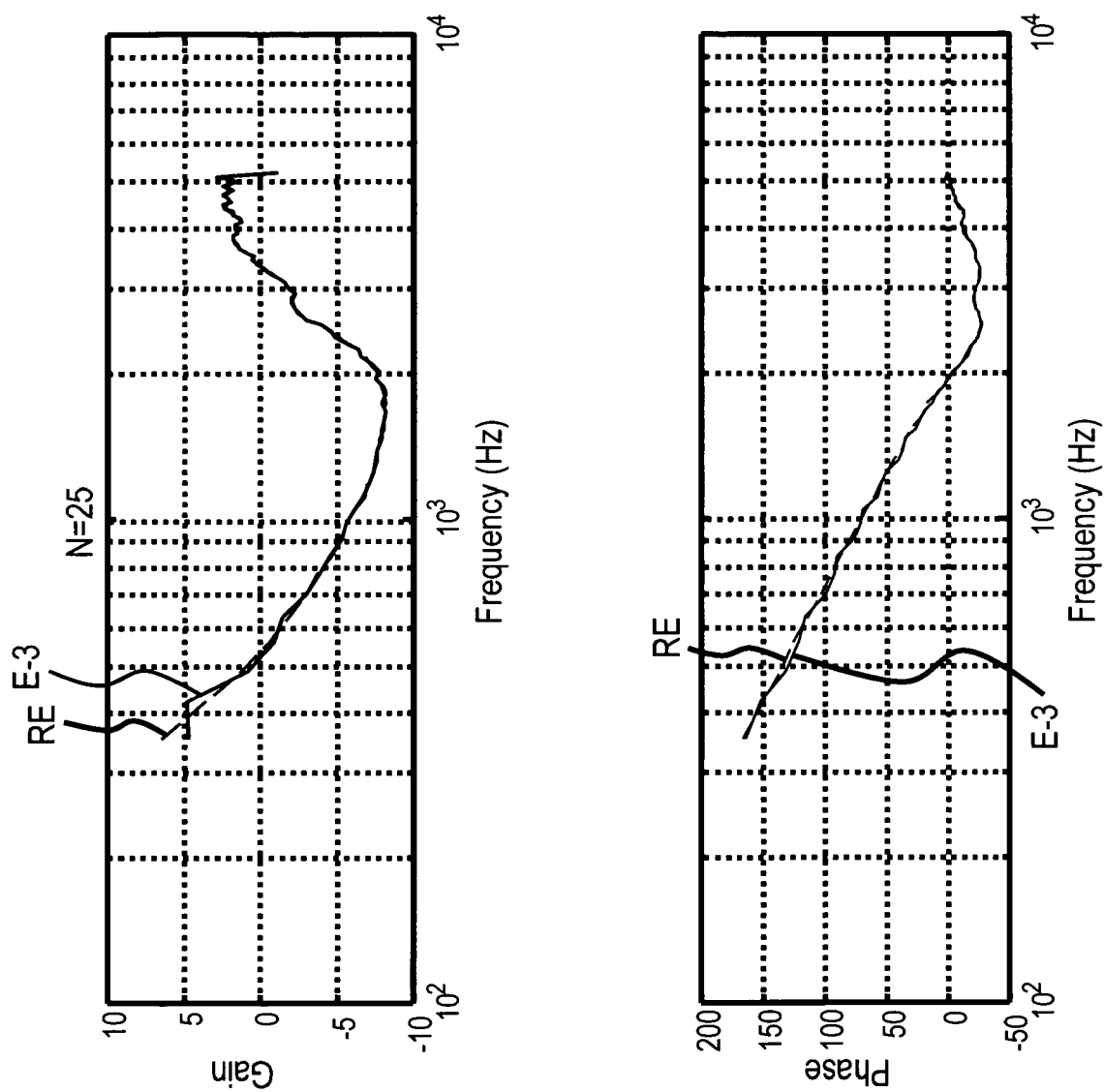
FIG. 16 are graphs depicting the frequency characteristics of the second embodiment in FIG. 14.

FIG. 14 is a graph depicting the filter function F(x) of the second embodiment of the present invention, FIG. 15 is a flow chart depicting the correction table creation processing of the second embodiment of the present invention, and FIG. 16 are graphics depicting the relationship of the frequency characteristics according to the second embodiment and actual sensitivity functions.

In the case of the above mentioned filter function F(x) for one rotation in FIG. 10, the values at both ends in FIG. 10 are close to "0". So F(x) at both ends for one rotation in the X direction are not used for calculation, but are removed, as shown in FIG. 14, and only the center part is used for calculation to decrease calculation amount.

The correction table creation processing will be described in details with reference to FIG. 15.

(S50) Just like step S40 in FIG. 13, the RRO correction value of each sector q of the correction table 29, that is RroTable(q), is initialized to "0". q is a value in the 0−(Ns−1) range. In other words, the number of servo sectors in one rotation is Ns.

(S52) Just like step S24 in FIG. 12 and step S42 in FIG. 13, the position error PES (k+i·Ns) of each sector k for all the N rotations of the magnetic disk 4 is measured, and the average value RPE(k) of the position error PES of each sector k is calculated. In other words, here it is assumed that the pointer of the sector is k, the number of servo sectors in one rotation is Ns, and i is the number of rotations (first cycle, second cycle, ... Nth cycle). Therefore in the expression in FIG. 13, the sum of the position error of each rotation of a same sector k, that is PES (k+i·Ns), is determined and divided by the number of measurement rotations N so as to obtain an average.

(S54) Then whether ||k−q|−Ns/2| exceeds L, which is the range of removing both ends of F(x) of one rotation in FIG. 14, is judged. If L is not exceeded, processing returns to step S52 to remove both ends, and if L is exceeded, processing advances to step S56 since both ends are no longer removed.

The meaning of this expression will be described. "x" of F(x) is the number of sectors Ns for one rotation (e.g. "150"), and k takes a values in a "0-149" range and q takes a value in a "0-149" range, so (k−q) takes a value from "−149" to "+149", that is a value for 2 Ns. Therefore F(x) in FIG. 14 is provided for three rotations, that is F(x), F(x−Ns) and F(x+Ns). The absolute value |x=k−q| is in a "0" to "149" range, and when Ns/2 ("75") is subtracted from this absolute value, the subtraction result is in a "−75" to "+75" range. The absolute value of this subtraction result is "0" to "75".

Therefore when the range of removing both ends of F(x) for one rotation in FIG. 14 is "L" respectively (e.g. "20 in the case of FIG. 14), "56" to "75" and "−56" to "−75" are removed in x=k−q for one rotation, so the available range of (k−q) for one rotation is "−55" to "+55". If (k−q) is "−54", then ||k−q|−Ns/2|=20, and if (k−q) is "+54", then ||k−q|−Ns/2|=20, so the removal range L is not exceeded. In other words, the available range of (k−q) can be judged as "−55" to "+55".

In other words, only the positive side in FIG. 14 is normalized, and the value of (k−q) is shifted for Ns/2=75, and whether it is in an available range or removal range is judged by comparing with the removal range (width).

(S56) Just like step S44 in FIG. 13, RRO(q) of the target sector q is calculated using the filter function F(k−q) of the F(x) table 23-2. In other words, when RroTable is generated, the RRO waveform at the q-th sector: RRO(q) is determined by the above mentioned Expression (20).

(S58) Finally the determined RRO(q) is multiplied by the above-mentioned optimum gain K, and the result is stored in the RroTable(q) of the correction table 29. And processing ends.

In this way, the calculation amount for the removal range L can be decreased. For example, in FIG. 14, the calculation amount is 150 times, from "75" to "−75", but the removal range L is "40" for both ends, so the calculation amount is 110 times, which is about ⅔.

FIG. 16 shows the comparison of the actual sensitivity function RE when 25 sectors at both ends are removed on a magnetic disk at 4200 rpm, a 150 sector/rotation, that is when 100 sectors at the center are used for calculation (solid line), and the frequency characteristic E-3 when F(x) is used, decreasing the calculation amount (dotted line). In the frequency characteristics in FIG. 16, the graph at the top shows frequency with respect to gain, and the graph at the bottom shows frequency with respect to phase. As FIG. 16 shows, RE and E-3 deviate somewhat in the low frequency area, but match well in the high frequency area.

Therefore the method for decreasing the calculation amount by removing both ends of the filter function F(x) does not deteriorate performance. Whether this method is used or not is determined depending on whether the calculation processing time actually satisfies the specifications of the disk device. If the processing time to be allowed is sufficient, then both ends need not be removed.

Third Embodiment of RRO Correction Table

Figure 17:
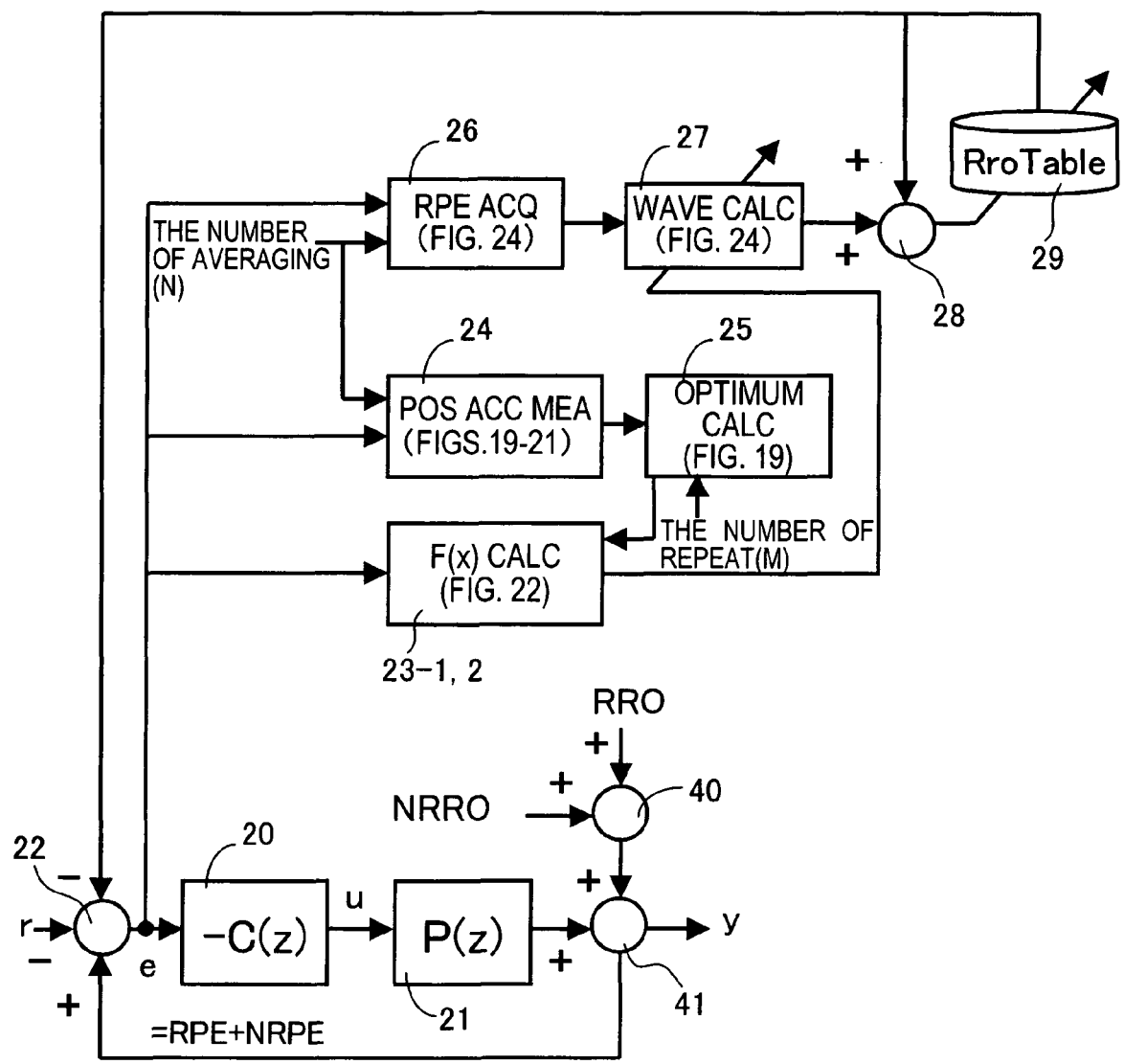
FIG. 17 is a block diagram depicting the servo control system having the RRO correction function of the third embodiment of the present invention.
Figure 18:
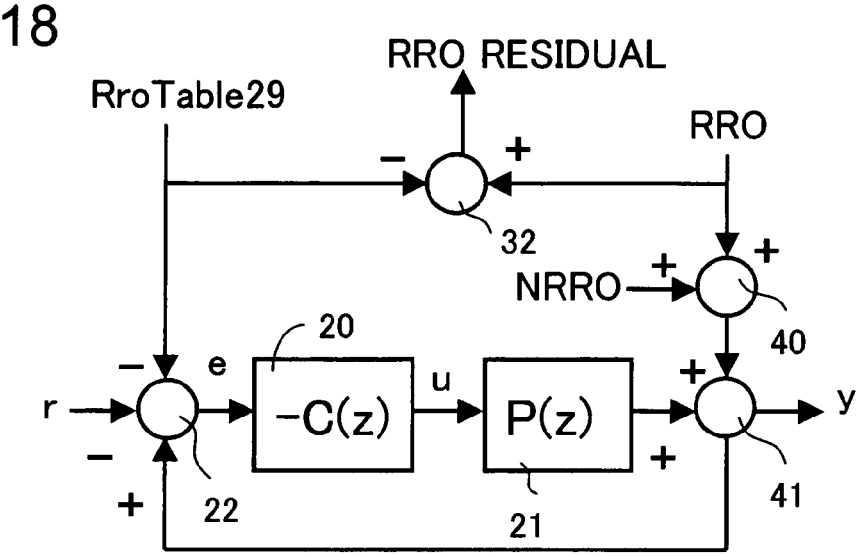
FIG. 18 is a diagram depicting the evaluation function for the optimum gain calculation in FIG. 17.
Figure 19:
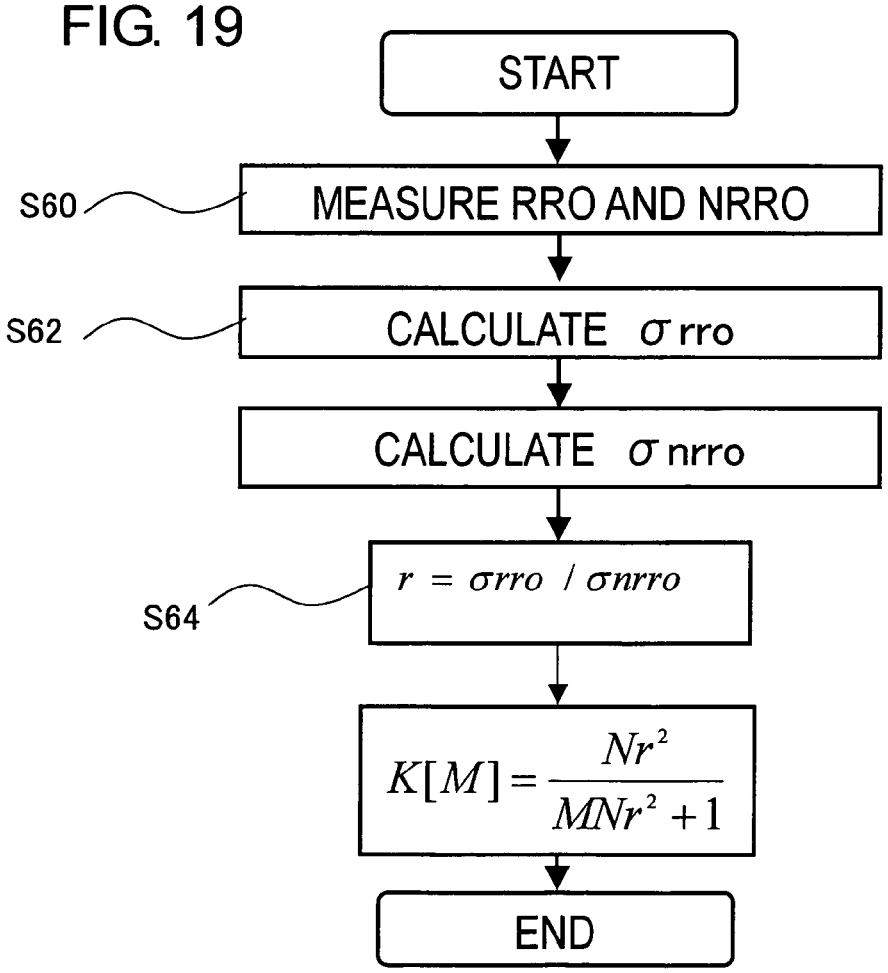
FIG. 19 is a flow chart depicting the optimum gain calculation processing in FIG. 17.
Figure 20:
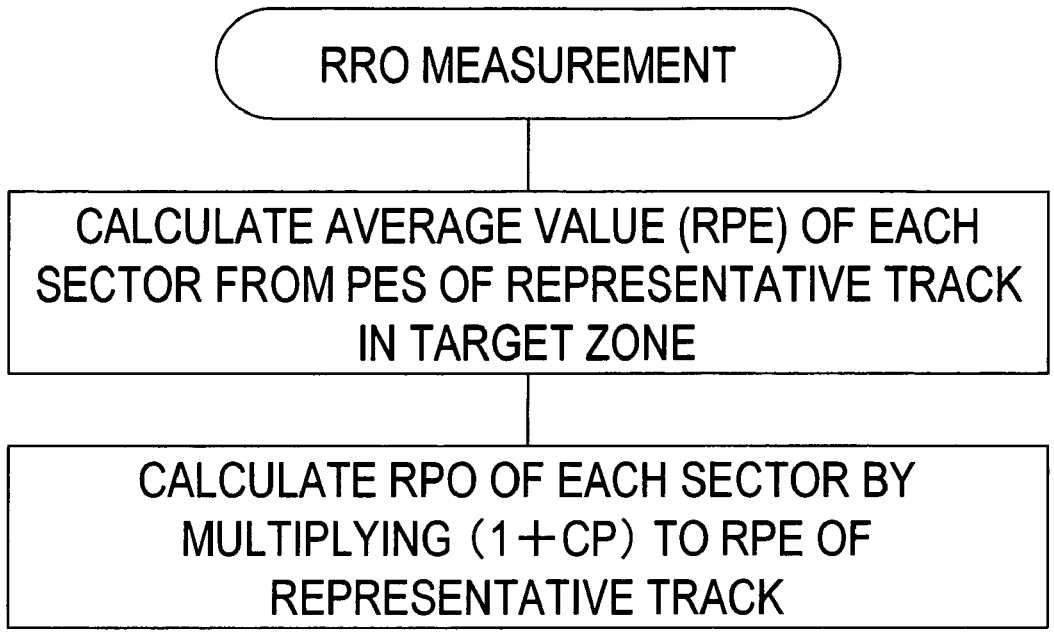
FIG. 20 is a flow chart depicting the RRO measurement processing in FIG. 19.
Figure 21:
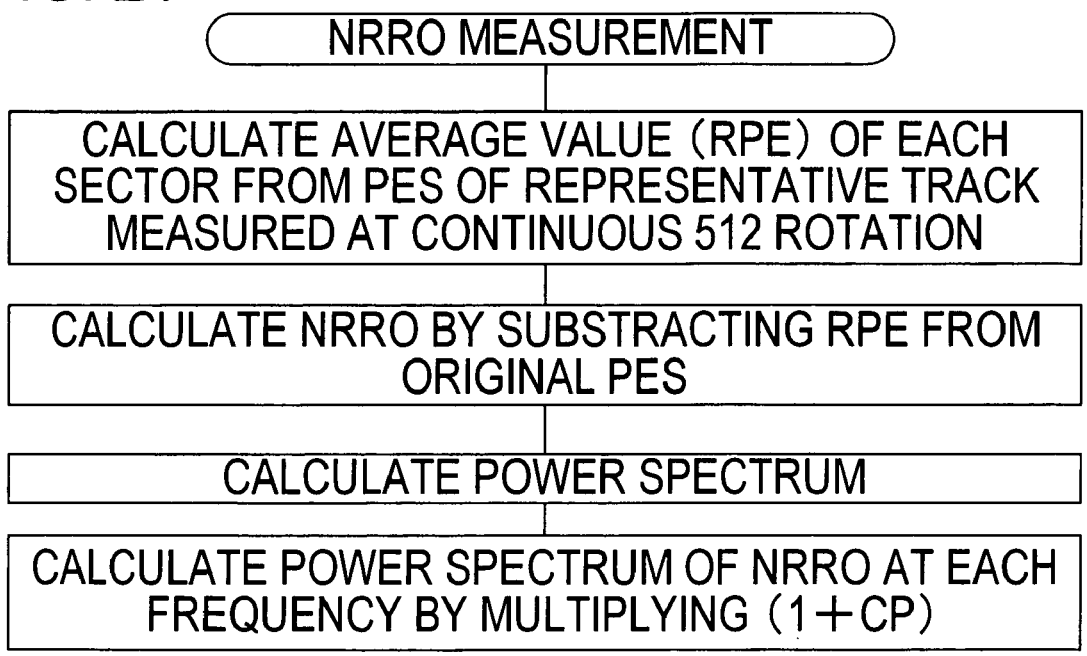
FIG. 21 is a flow chart depicting the NRRO measurement processing in FIG. 19.
Figure 22:
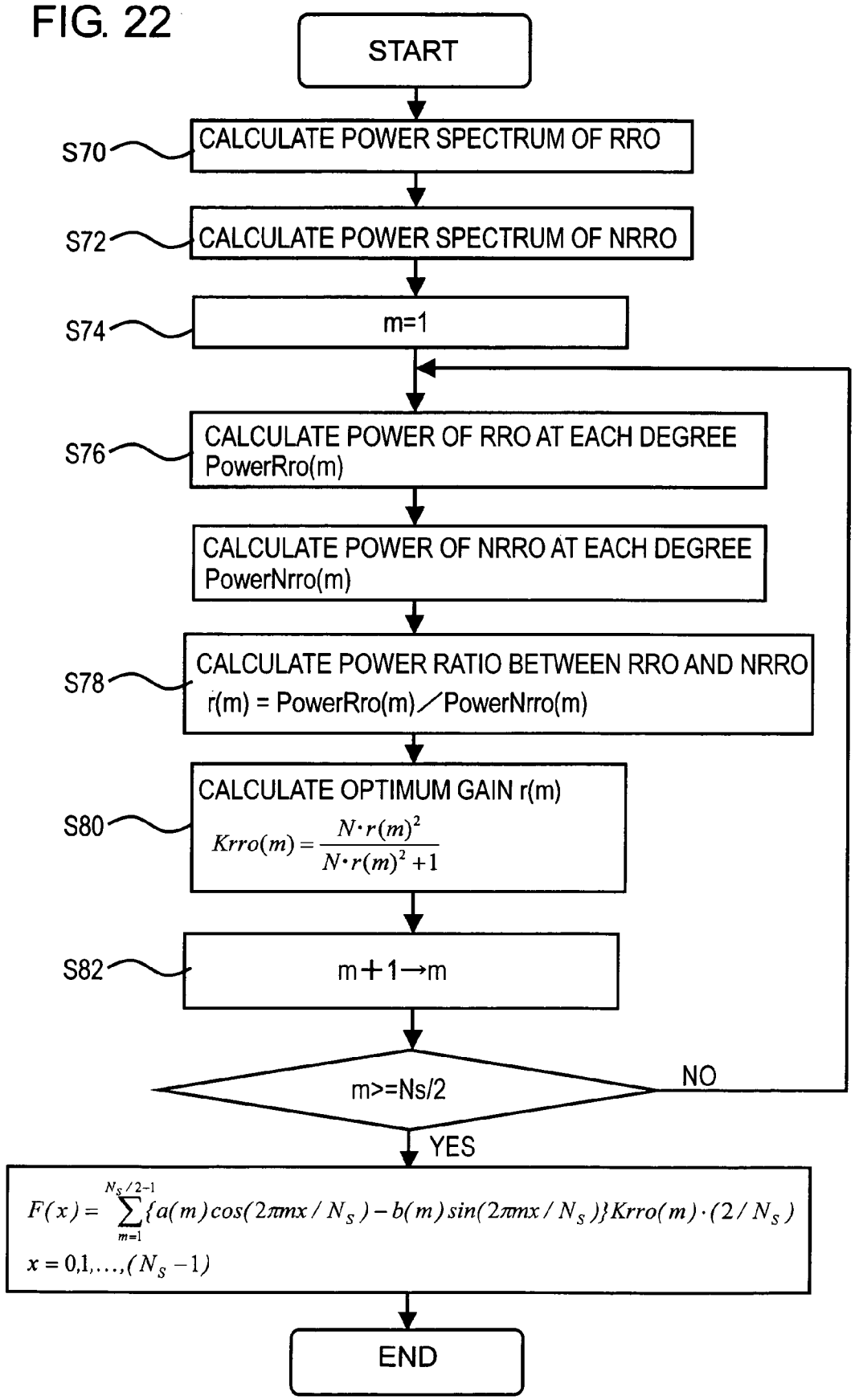
FIG. 22 is a flow chart depicting the optimum gain measurement processing for each RRO degree in FIG. 19.
Figure 23:
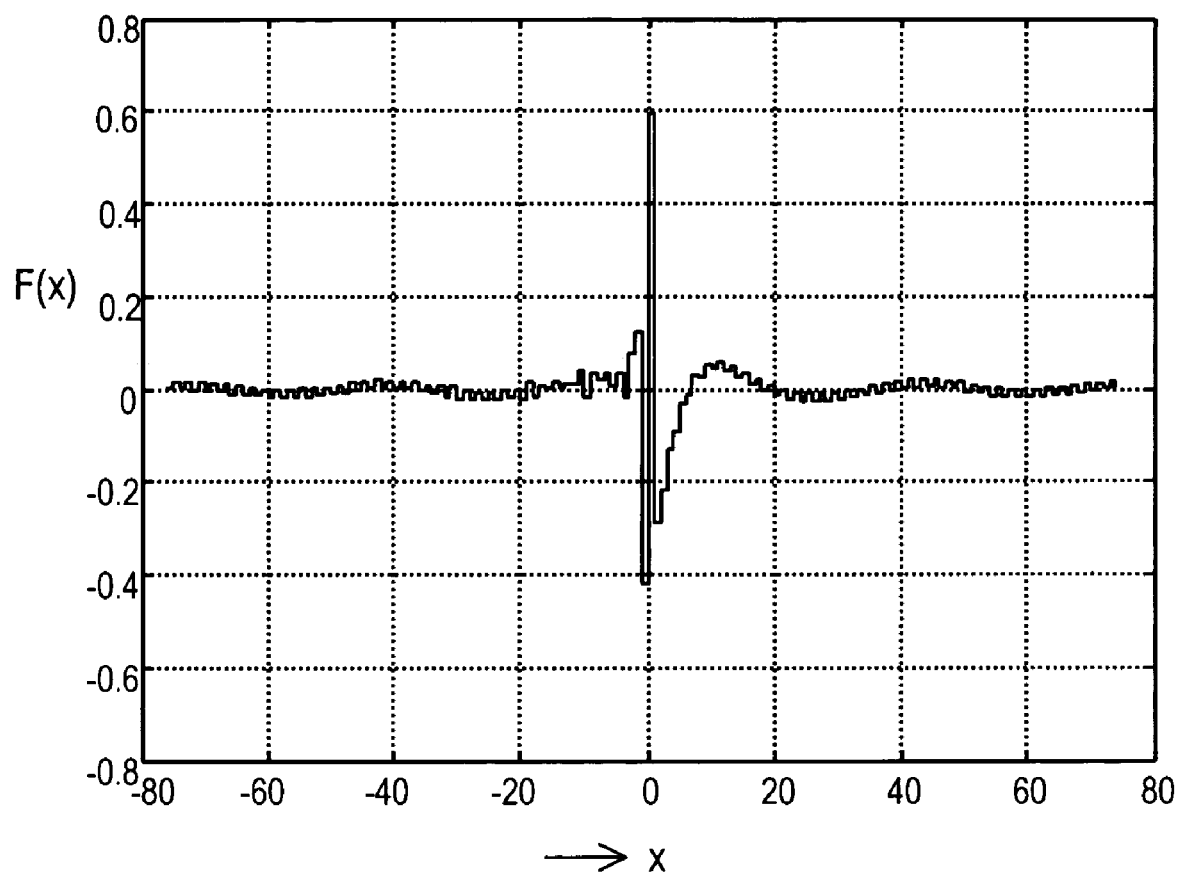
FIG. 23 is a graph depicting the filter function F(x) including the optimum gain in FIG. 19.
Figure 24:
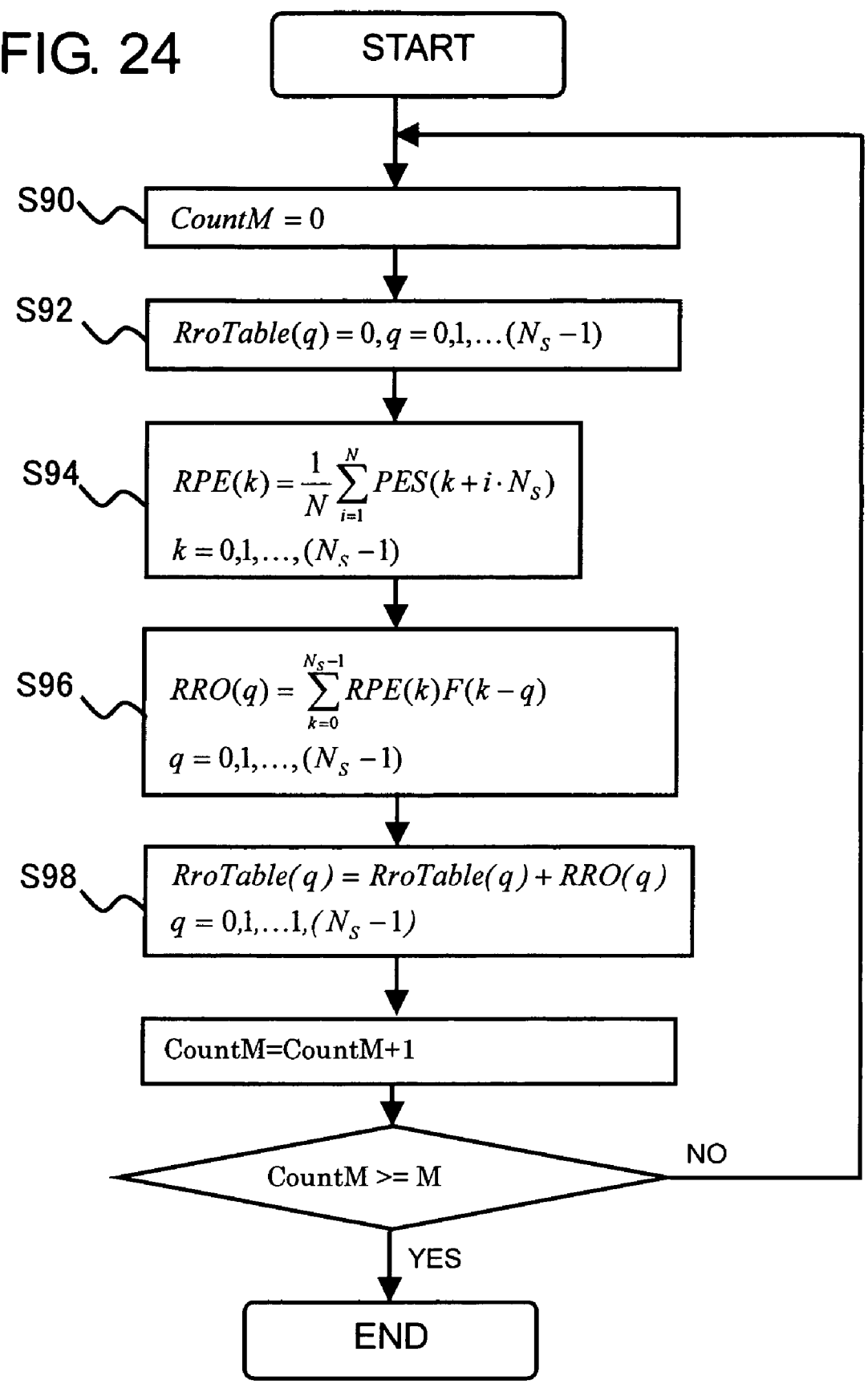
FIG. 24 is a flow chart depicting the RRO table creation processing in FIG. 17.

FIG. 17 is a block diagram depicting the third embodiment of the head positioning control system of the present invention, FIG. 18 is a diagram depicting the residual RRO for creating RroTable, FIG. 19 is a flow chart depicting the RRO gain optimum value calculation processing using the residual RRO, FIG. 20 is a flow chart depicting RRO measurement processing in FIG. 19, FIG. 21 is a flow chart depicting NRRO measurement processing in FIG. 19, FIG. 22 is a flow chart depicting F(x) computation processing of the F(x) computation block in FIG. 17, FIG. 23 is a graph depicting the filter function F(x) by the processing in FIG. 22, and FIG. 24 is a flow chart depicting the RPE acquisition and waveform calculation processing in FIG. 17.

FIG. 17 is also a block diagram when the optimum value calculation and correction table creation are performed by a single disk device, and composing elements the same as FIG. 6 and FIG. 7 are denoted with the same reference numerals. In other words, the error 'e' between the target position 'r' and the current (observing) position 'y' is determined by the computation block 22, and the controller 20 performs control computation, calculates the control amount and drives the VCM 1, that is the plant 21. For the position of the plant 21, servo signals are demodulated from the magnetic head 3, and the current position 'y' is acquired. The difference between the current position 'y' and the target position 'r' becomes the position error 'e'. As the disturbance to be applied to this control system, components synchronizing rotation of the spindle motor 5 and components not synchronizing are shown as RRO, NRRO, RPE and NRPE.

The RPE acquisition block 26 acquires RPE from the position error 'e' for each sector, as described above. The position accuracy measurement block 24 measures position accuracy from the position error 'e', as described later in FIG. 19 to FIG. 21. The optimization calculation block 25 calculates the optimum gain when the number of repeats is M, as described in FIG. 19. The waveform calculation block 27 calculates the RRO waveform by multiplying RPE acquired by the RPE acquisition block 26 by the filter function F(x) including the calculated optimum gain. The RRO table 29 stores the RRO waveform. The addition block 28 adds the RRO waveform for the number of repeats, and updates the table 29, as described later in FIG. 24.

The F(x) computation block 23-1 computes one filter function value F(x) where a series of DFT computation expressions are integrated based on the position error 'e', and stores the computed function F(x) in the function F(x) table 23-2, as described later in FIG. 22.

After creating the RRO table 29, the target position 'r' and the RroTable value of the correction table 29 are subtracted from the observing position 'y', and the position error 'e' is generated by the computation block 22 in magnetic disk device operating status (particularly in the following status). By this, RRO creation is performed for the input 'e' to the controller 20.

Before describing the optimum value (gain) calculation and the correction table creation, the evaluation function for calculating the optimum value of the gain will be described with reference to FIG. 18. First RroTable (correction table) is generated, and a specific sector is considered, for residual RRO after RRO correction is executed, for positioning control. In other words, as FIG. 18 shows, the residual RRO is the result of subtracting the RRO correction value of RroTable 29 from the actual RRO.

Here it is assumed that the value of the sum of (RRO+NRRO) can be observed by applying a discrete Fourier transform (DFT) to the observing position 'y'. This waveform of (RRO+NRRO) is observed continuously for N rotations, and the average value of each sector is measured. It is also assumed that RRO of this sector is RO. And it is also assumed that the value of NRRO at each measurement changes as n11, n12, ... n1N. At this time, the waveform of (RRO+NRRO) after averaging for N rotations, that is the RRO estimated value, is given by the following Expression (21).

$$R_0 + 1/N \sum_{i=1}^{N} n_{1i} \quad (21)$$

This value is multiplexed by the gain K, and the result is substituted in the RRO correction table RroTable 29 (the RRO correction table is "0" because this is the first measurement). Then positioning control is performed using the RRO correction table, and the residual RRO is given by Expression (22).

$$R_1 = R_0 - K \left\{ R_0 + 1/N \sum_{i=1}^{N} n_{1i} \right\} = (1-K)R_0 - K/N \sum_{i=1}^{N} n_{1i} \quad (22)$$

In this way, the second measurement is performed where the value is multiplied by the additional gain K, and the result is added to the RRO correction table 29, and positioning control is performed using the RRO correction table, then the residual RRO: R2, is given by Expression (23).

$$R_2 = R_1 - K \left\{ R_1 + 1/N \sum_{i=1}^{N} n_{2i} \right\}$$

$$= (1-K)^2 R_0 - K/N \left\{ (1-K) \sum_{i=1}^{N} n_{1i} + \sum_{i=1}^{N} n_{2i} \right\} \quad (23)$$

When this is repeated sequentially, then the residual RM of RRO after M times of correction, is given by the following Expression (24). In the following expression, however, the suffix of NRRO "i" is replaced with "j".

$$R_M = (1-K)^M R_0 - K/N \sum_{i=1}^{M} \left\{ (1-K)^{i-1} \sum_{j=1}^{N} n_{ij} \right\} \quad (24)$$

RO, which is the original RRO of each sector, is assumed to present normal distribution if it is observed at many tracks. It is generally known that NRRO also presents normal distribution. And RRO and NRRO are not correlated. Therefore RRO and NRRO can be considered independently.

In other words, the components caused by RRO in the first term at the right hand side of Expression (24) and the components caused by NRRO in the second term can be handled separately. For variance when the residual RRO is determined at many points, the standard deviations corresponding to the first term of Expression (24) and the standard deviations corresponding to the second term thereof are determined independently. The sum of the squares of the respective results become the variance.

First for the RRO of the first term, Nm number of RROs at each sector are measured at many tracks, and if the values are R1, R2, ... RNm, the standard deviation σRRO of the RRO is determined by the following Expression (25).

$$\sigma_{RRO}^2 = \sum_{i=1}^{Nm} Ri^2 / (Nm - 1) \quad (25)$$

The components caused by RRO in the residual RRO after correction follow the first term at the right hand side of Expression (24), so RRO at many points is regarded as R1, R2, ... RNm instead of RO at many points in the first term at the right hand side, and this is substituted in Expression (25), then the variance of the components caused by RRO in the residual RRO (square of standard deviation a RRO) can be expressed by the following Expression (26).

$$\sum_{i=1}^{Nm} \{(1-K)^M Ri\}^2 / (Nm-1) = \quad (26)$$

$$(1-K)^{2M} \sum_{i=1}^{Nm} Ri^2 / (Nm-1) = (1-K)^{2M} \sigma_{RRO}^2$$

Then for NRRO, the standard deviation caused by NRRO is assumed to be σNRRO. The distribution of nij in the second term at the right hand side in Expression (24) follows this standard deviation σNRRO. In other words, if the sum of NRRO for N samples is expressed by the standard deviation σNRRO, that is an expected value of the sum, then the result becomes the following Expression (27).

$$\sum_{i=1}^{N} n_{ij} = \left( \sum_{i=1}^{N} \sigma_{NRRO}^2 \right)^{0.5} = \sqrt{N} \, \sigma_{NRRO} \quad (27)$$

Therefore if the variance of the components caused by NRRO in the second term at the right hand side in Expression (24) is expressed using σNRRO, Expression (27) is substituted in the second term at the right hand side of Expression (24), and the result is squared, then this result can be expressed by the following Expression (28).

$$K^2/N^2 \sum_{i=1}^{M} \left\{ (1-K)^{2(i-1)} \left( \sqrt{N} \, \sigma_{NRRO} \right)^2 \right\} = \quad (28)$$

$$K^2/N \sum_{i=1}^{M} (1-K)^{2(i-1)} \sigma_{NRRO}^2$$

Therefore the variance of residual RRO after correction (square of σ) can be expressed by Expression (29), using Expression (26) and Expression (28). This becomes an evaluation expression for calculating the effect of RRO correction. Under given conditions, the variables can be adjusted so that the value of Expression (29) becomes the minimum. If this expression is used, a combination of optimum variables: N (number of samples), M (number of repeats of measurement and correction) and K (additional gain) can be determined according to the σ ratio of RRO and NRRO.

$$(\text{Residual } RRO \, \sigma)^2 = (1-K)^{2M} \sigma_{RRO}^2 + K^2/N \sum_{i=1}^{M} (1-K)^{2(i-1)} \sigma_{NRRO}^2 \quad (29)$$

Then an algebraic solution of the optimum conditions to minimize the residual RRO is determined from Expression (29). First the case when the number of repeats M is "1" is considered. In Expression (29), if the value of the number of repeats M is "1", then Expression (29) becomes the following Expression (30).

$$(\text{Residual RRO } \sigma)^2 = (1-K)^2 \sigma_{RRO}^2 + (K^2/N)\sigma_{NRRO}^2 \tag{30}$$

If the ratio of the respective σ of RRO and NRRO before correction is r and is substituted in Expression (30), then the standard deviation r[1] of the normalized residual RRO (as described variance r[1]²) can be expressed as the following Expression (31) using this ratio r.

$$r^2 = \sigma_{RRO}^2 / \sigma_{NRRO}^2 \tag{31}$$

Variance of normalized residual RRO=r[1]²=(1−K)²r²+K²/N

In order to determine the additional gain K to minimize the residual RRO, the conditions, under which the value when Expression (31) is differentiated with K becomes "0", are determined. In other words, if the differentiated value is "0", then the residual RRO becomes the minimum. Therefore the additional gain K, which minimizes the residual RRO, can be acquired by the following Expression (32).

$$\frac{\partial}{\partial K} r[1]^2 = -2(1-K)r^2 + 2K/N = 0 \tag{32}$$

$$\rightarrow K = \frac{Nr^2}{Nr^2 + 1}$$

At this time, the standard deviation r[1] of the normalized residual RRO (normalized residual RRO after first correction) of Expression (31) is acquired by the following Expression (33) substituting Expression (32) in Expression (31).

$$r[1]^2 = \left(1 - \frac{Nr^2}{Nr^2 + 1}\right)^2 r^2 + \left(\frac{Nr^2}{Nr^2 + 1}\right)^2 \frac{1}{N} = \tag{33}$$

$$\frac{r^2}{(Nr^2 + 1)^2} + \frac{Nr^4}{(Nr^2 + 1)^2} = \frac{R^2}{Nr^2 + 1}$$

As a consequence, for the optimum gain K, the standard deviation of the normalized residual RRO, the variance of residual RRO, the ratio of the residual RRO to the original RRO, which indicates the positioning accuracy, and the RRO reduction ratio can be given by the relational expressions shown in the following Expressions (34). By this, if N (number of samples), σRRO (standard deviation of RRO) and σNRRO (standard deviation of NRRO) are given, then the gain K, to minimize the residual RRO, is uniquely determined.

Optimum gain:

$$K = \frac{Nr^2}{Nr^2 + 1}$$

Variance of normalized residual RRO:

$$r[1]^2 = \frac{r^2}{Nr^2 + 1} = \frac{K}{N}$$

Variance of residual RRO:

$$r[1]^2 \sigma_{NRRO}^2 = \frac{r^2}{Nr^2 + 1} \sigma_{NRRO}^2 = \frac{K}{N} \sigma_{NRRO}^2 \tag{34}$$

Ratio of residual RRO to original RRO:

$$\sqrt{\frac{1}{Nr^2 + 1}} = \sqrt{\frac{K}{Nr^2}}$$

RRO reduction rate:

$$1 - \sqrt{\frac{1}{Nr^2 + 1}} = 1 - \sqrt{\frac{K}{Nr^2}}$$

The above expressions exist when the number of repeats M of measurement and correction is "1", and the optimum gain K[k] and the normalized residual RRO: r[M] when the number of repeats M is 2 or more, are determined. From the Expression (32) and Expression (33), the following Expression (35) is acquired. Here K[1], K[2], . . . are gains with different values. In other words, each time one measurement and correction is repeated, the optimum additional gain can be set for each time, changing the value of the additional gain K.

$$K[M] = \frac{Nr^2}{MNr^2 + 1} \tag{35}$$

$$r[M]^2 = \frac{K[M]}{N} = \frac{r^2}{MNr^2 + 1}$$

Therefore when the number of repeats M is an arbitrary number, the relational expressions shown in the following Expressions (36) are acquired, just like Expressions (34).

Optimum gain at Mth repeat:

$$\frac{Nr^2}{MNr^2 + 1}$$

Variance of normalized RRO at Mth repeat:

$$r[M]^2 = \frac{K[M]}{N} = \frac{r^2}{MNr^2 + 1} \tag{36}$$

Variance of RRO at Mth repeat:

$$r[M]^2 \sigma_{NRRO}^2 = \frac{K[M]}{N} \sigma_{NRRO}^2 = \frac{r^2}{MNr^2 + 1} \sigma_{NRRO}^2$$

Ratio of residual RRO to original RRO:

$$\sqrt{\frac{1}{MNr^2+1}} = \sqrt{\frac{K[M]}{Nr^2}}$$

RRO reduction rate:

$$1 - \sqrt{\frac{1}{MNr^2+1}} = 1 - \sqrt{\frac{K[M]}{Nr^2}}.$$

With reference to FIG. 20 and FIG. 21, the optimum gain calculation processing is described according to FIG. 19.

(S60) Using the magnetic disk device with the configuration shown in FIG. 1, the magnetic disk 4 is rotated, and the magnetic head 3 is track-follow controlled by the control system shown in FIG. 17 according to the servo information of the magnetic disk 4, and RRO and NRRO are measured. For the measurement of RRO, the magnetic disk is divided into a plurality of zones in the radius direction, as shown in FIG. 20, and the magnetic head is positioned in a representative track of each target zone. And the positioning accuracy measurement block 24 in FIG. 16 measures the PES (Positional Error signal) (error 'e' in FIG. 17) in each sector of the representative track in all the target zones. The measurement block 24 calculates the average value of the plurality of tracks for each sector, and acquires the average value as RPE (Repeatable Position Error). As Expressions (3) show, this RPE of each sector is multiplied by the transfer function (1+CP) so as to calculate the RRO of each sector. In the same way, for the measurement of NRRO, PES of one representative track of each sector is measured for a relatively long time, e.g. 512 rotations of the disk, as shown in FIG. 21, and the average value thereof is calculated as RPE. Then for each sector, RPE is subtracted from the measured PES, and the NRPE of each sector is calculated. The power spectrum of this calculated NRPE is calculated by an FFT (Fast Fourier Transform), and is separated into each frequency. NRPE separated for each frequency is multiplied by the transfer function (1+CP), as shown in Expression (3), and the power spectrum of NRRO for each frequency is calculated.

(S62) Then the optimum value calculation block 25 in FIG. 17 calculates the standard deviation σrro of RRO from the determined RRO of each sector according to Expression (25). In the same way, the standard deviation σnrro of NRRO is calculated from the determined NRRO of each sector according to Expression (27).

(S64) The ratio r of the standard deviation σ is calculated from the standard deviation σrro of RRO and the standard deviation σnrro of NRRO using Expression (31), and the optimum gain K or K[M] is calculated using Expression (32) or Expression (35).

In this way, the evaluation function is determined with the residual RRO after correction as the evaluation target, and the gain to minimize the residual RRO, that is to minimize the RRO after correction, is theoretically determined from the evaluation function. Therefore the correction table creation gain can be determined without depending on experiment. Also the value of RRO after correction can be guaranteed at a predetermined value, and the manufacturing time and the device specifications can be determined.

Now the above mentioned filter function F(x) creation processing, incorporating this optimum gain, will be described with reference to FIG. 22 and FIG. 23. The above mentioned embodiment in FIG. 19 is a method of multiplying the determined estimated RRO waveform by an optimum gain K and adding the result to RroTable, in other words, a uniform gain K is multiplied to all the frequency areas without considering the frequency characteristics of RRO and NRRO. However in an actual disk device, the frequency characteristic is different between RRO and NRRO. In other words, the ratio of RRO and NRRO is different depending on the frequency.

In the following embodiment, the σ of RRO and the σ of NRRO are determined for each degree of RRO, and the optimum gain K can be determined from the ratio according to the above mentioned expressions (32) or (35). FIG. 22 is a flow chart depicting the filter function F(x) calculation processing including the optimum gain calculation of the present invention. In this description, it is assumed that the degree of the RRO is m, and m=1 to Ns/2−1 according to the Nyquist theorem.

(S70) First just like step S60 in FIG. 19, the power spectrum of RRO is determined. The power spectrum of RRO targets a plurality of tracks in a zone. RRO is determined not for such a small number of tracks as "2" and "4", but for several tens or several hundreds of tracks. The RRO waveform may be determined by multiplying RPE by the reverse characteristic of the sensitivity function. Or a waveform, which does not follow-up RRO, may be generated in each track taking sufficient time. After determining the RRO of each track in this way, all the RRO waveforms are lined up in a row, and the power spectrum is determined.

(S72) Then the power spectrum of NRRO is determined. Just like FIG. 21, the position error 'e' is observed by an FFT analyzer, and the power spectrum of (RPE+NRPE) is determined, then RPE is subtracted from the result to determine NRPE. And the result is multiplied by the inverse characteristic of the sensitivity function. The locus RroTable where RRO is ignored may be generated taking sufficient time, and the power spectrum of NRPE may be determined after suppressing RPE in the position error 'e' almost to "zero".

(S74) Then the RRO degree m is initialized to "1".

(S76) Then the power spectrum of RRO and NRRO are multiplied by the frequency characteristic of DFT computation. In DFT computation, sine and cosine are multiplied as shown in Expression (11). The target degree m is determined, and a signal is supplied at every predetermined frequency interval in the frequency area to be observed, that is from 0 Hz to (sampling frequency/2), and the power PowerPro(m) of RRO and the power PowerNrro(m) of NRRO, which are the output characteristics of DFT, are determined. In other words, to perform DFT of the power spectrum of the m degree of RRO and NRRO, the power spectrum of one rotation from sector No. 0 to No. (Ns−1) is multiplied by the cosine waveform and sine waveform, and the results are added, and the m degree of coefficients C(m) and S(m) are calculated as shown in Expression (11). This becomes the frequency characteristics of the detection characteristics of DFT computation. In this way, the power spectrum PowerNrro(m) of NRRO and the power spectrum PowerRro(m) of RRO for each RRO degree are determined.

(S78) Comparing these two spectrums, the ratio r(m) of the σ of RRO (PowerRro(m)) and the σ of NRRO (PowerNrro(m)) is determined for each RRO degree.

(S80) Applying this σ ratio r(m) to the above-mentioned optimum condition Expression (32) or (35), the optimum gain Krro(m) or Krro(M, m) of each RRO degree is calculated.

(S82) The RRO degree m is incremented "1", and it is judged whether the RRO degree m is an observable Nyquist frequency (Ns/2) or more. If the RRO degree m is not more than (Ns/2), processing returns to step S76, and the optimum gain Krro(m) or Krro(M, m) of each RRO degree is calculated. If the RRO degree m is an observable Nyquist frequency (Ns/2) or more, the optimum gain calculation processing ends, and F(x) is calculated by the following Expression (37) from a(m), b(m) and Krro(m) calculated in FIG. 13.

$$F(x) = \sum_{m=1}^{N_s/2-1} \{a(m)\cos(2\pi mx/N_s) - b(m)\sin(2\pi mx/N_s)\}Krro(m) \quad (37)$$

$$x = 0, 1, \ldots, (N_s - 1)$$

As described above, the gain for each RRO degree can be determined, and the filter function F(x) including this gain, can be calculated in advance. FIG. 23 is a graph depicting an example of the filter function F(x) including the optimum gain. With this, the processing time to create the RRO creation table can be further decreased while setting the optimum gain.

RRO table creation processing using this filter function F(x) will now be described with reference to FIG. 24. Here it is assumed that the optimum gain K is determined in the processing in FIG. 22 by the position accuracy measurement block 24 and the optimum value calculation block 25 in FIG. 17, and F(x) is acquired by the F(x) computation blocks 23-1 and 23-2, and creation processing for the RRO creation table 29 by the RPE acquisition block 26 and waveform calculation block 27 in FIG. 17 will be described.

(S90) The measurement and correction count value count M is initialized to "0".

(S92) Just like step S50 in FIG. 15, the RRO correction value RroTable(q) of each sector q of the correction table 29 is initialized to "0". q here is a value in a 0 to (Ns−1) range. In other words, the number of servo sectors in one rotation is Ns.

(S94) Just like step S52 in FIG. 15, the position error PES (k+1·Ns) of each sector pointer k of all the N rotations of magnetic disk 4 is measured, and the average value RPE(k) of the position error PES of each sector pointer k is calculated. In other words, here it is assumed that the pointer of the sector is k, the number of servo sectors in one rotation is Ns, and i is the number of rotations (first cycle, second cycle, . . . Nth cycle). Therefore in the expression in FIG. 24, the sum of the position error PES (k+1·Ns) of each rotation of a same sector, indicated by the sector pointer k, is determined, and is divided by the number of measurement rotations N so as to obtain an average.

(S96) Just like step S44 in FIG. 13, the average values RPE(k) of the position error of all the sector points are measured and calculated, and the RRO(q) of the target sector q is calculated using the filter function F(k−q) including the optimum gain of the F(x) table 23-2 and the average value RPE (k). In other words, when the RroTable is generated, the RRO waveform at the q-th sector: RRO(q) is determined by the above mentioned Expression (20).

(S98) Finally the determined RRO(q) is added to the RroTable(q) of the correction table 29, and the added value is stored in the RroTable(q) of the correction table 29. And the measurement and correction count value CountM is increased "1". Then it is judged whether the measurement and correction count value CountM is "M" or more. If the count value CountM does not exceed "M", processing returns to step S94. If the count value CountM is "M" or more, M number of times of measurement and correction have been completed, so the correction table creation processing ends.

As mentioned above, the evaluation function is determined for the residual RRO after correction as the evaluation target, and from this evaluation function, the gain K which minimizes the residual RRO, in other words, which minimizes the RRO after correction, that is K (CountM), is determined according to FIG. 22, and the result is incorporated with the filter function F(x), so as to create the correction table according to FIG. 24. Therefore in addition to the above mentioned effect of the filter function F(x), the correction table creation gain, which is the optimum for the creation time and device specifications, can be determined without depending on experiment, and based on this the correction table can be created. Also the value of RRO after correction can be guaranteed based on which manufacturing time and device specifications can be determined.

Fourth Embodiment of RRO Correction Table Creation Method

Figure 25:
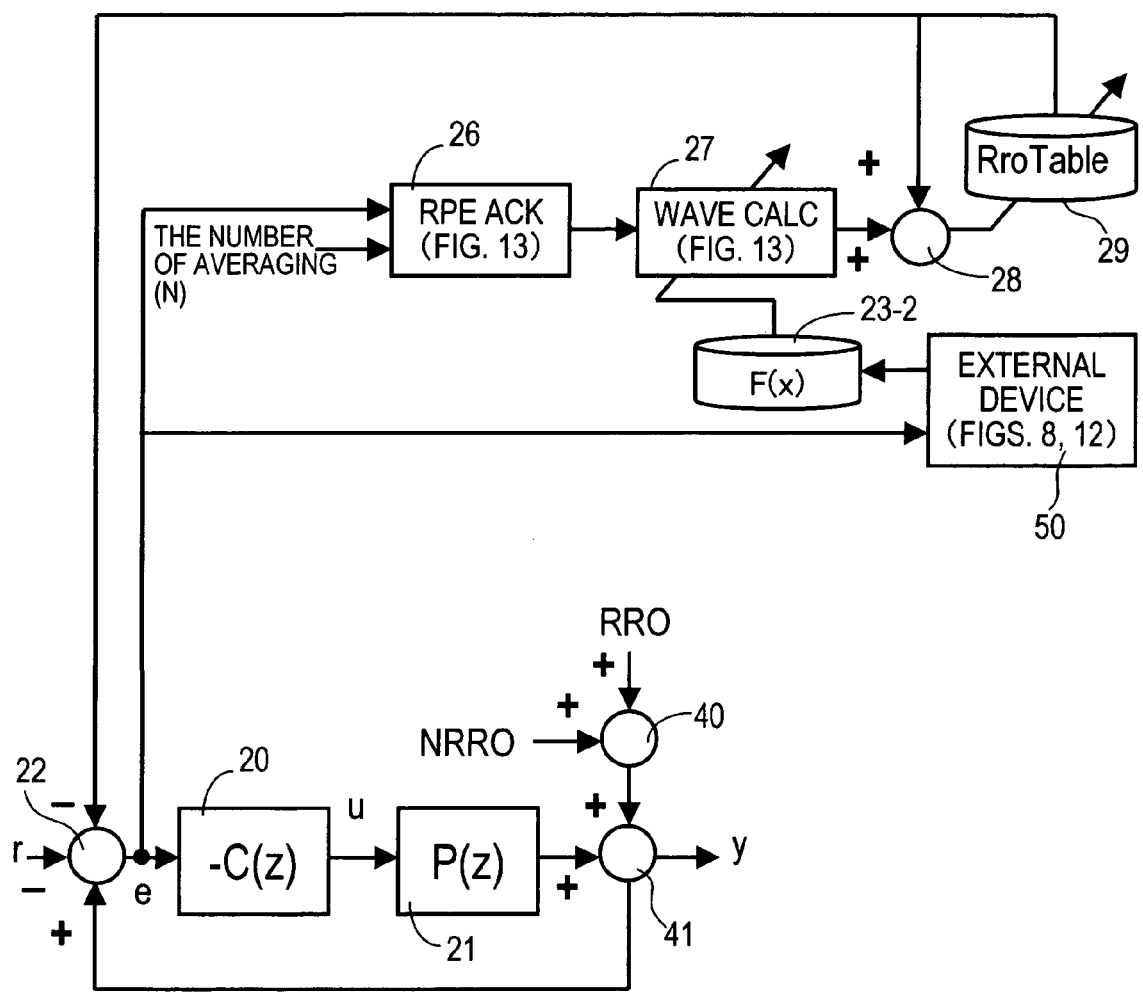
FIG. 25 is a block diagram depicting a servo control system having the RRO correction function according to the fourth embodiment of the present invention.

FIG. 25 is a block diagram depicting the fourth embodiment of the RRO correction table creation system of the present invention. In FIG. 25, composing element the same FIG. 7 are denoted with the same reference numerals, and the difference from FIG. 7 is that the filter function F(x) calculation processing 23-1 (FIG. 8, FIG. 12) is executed by an external device (e.g. personal computer) 50 connected to the disk device, and the result is set in the F(x) table 23-2 in the disk device.

Since the filter function F(x) of DFT is calculated using the external device 50 in this way, load of the MCU 14 of the disk device can be decreased and calculation speed increases. Copying the filter function F(x) of DFT to another disk device is also easy, which is suitable for mass production. The optimum gain calculation in FIG. 17 can also be performed by the external device 50.

Figure 26:
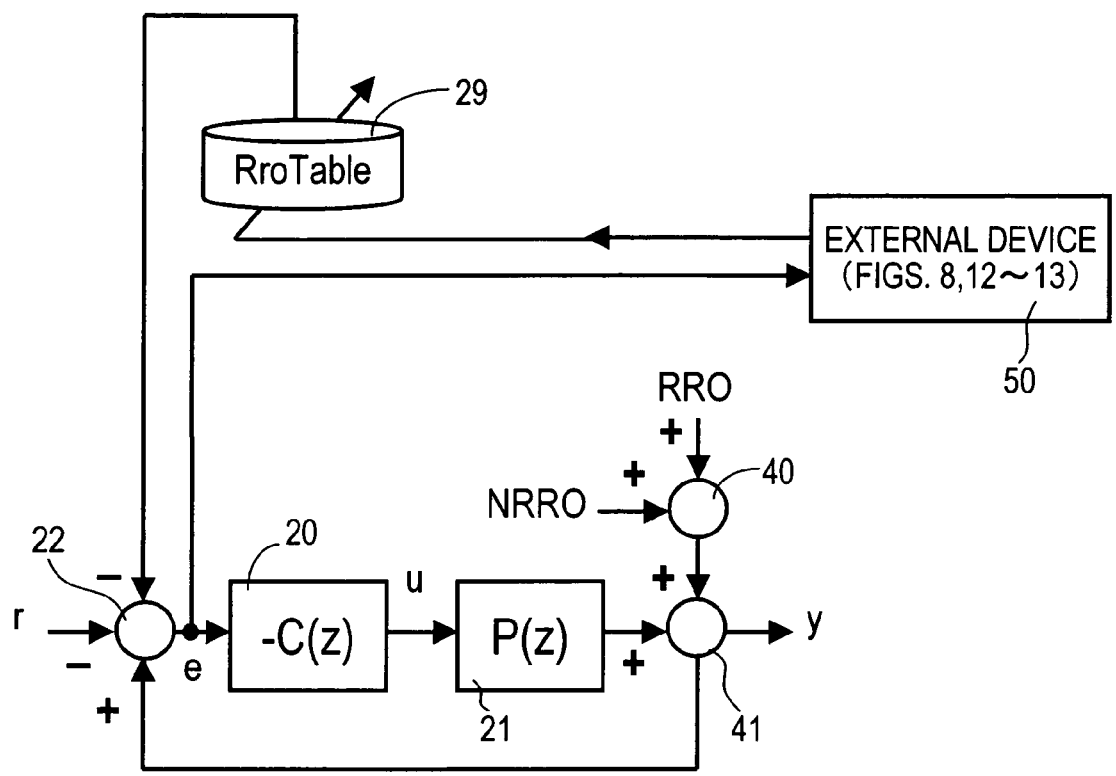
FIG. 26 is a block diagram depicting another servo control system having the RRO correction function according to the fourth embodiment of the present invention.

FIG. 26 is a block diagram depicting a modified form of the RRO correction table creation method of the fourth embodiment of the present invention. In FIG. 25, composing elements the same in FIG. 7 are denoted with the same reference numerals, and the difference from FIG. 7 is that the filter function F(x) calculation processing 23-1 (FIG. 8, FIG. 12), RPE acquisition processing 26 (FIG. 13) and waveform calculation processing 27 (FIG. 13) are executed by the external device (e.g. personal computer) 50 connected to the disk device, and the result is set to the RRO correction table 29 in the disk device.

Since the table values of the RRO correction table 29 are calculated using the external device 50 in this way, load of the MCU 14 of the disk device can be decreased and calculation speed increases. A correction table creation-processing program is unnecessary in the disk device after shipment of the disk device, so time for loading this program on the disk device is eliminated. In the same way, the optimum gain calculation in FIG. 17 may be performed by the external device 50.

For a plurality of disk devices in a same lot, a correction table 29 of a representative disk device may be created in the configuration of FIG. 25 or FIG. 26, and this correction table 29 can be copied to other disk devices. This can further decrease the manufacturing time.

URRO Correction Table Creation Method

The above mentioned various expressions are on the RroTable. The issue regarding noise, however, can be discussed in the same way as for the current waveforms: URroTable as well. In other words, RroTable can be converted into URroTable according to the later mentioned relational expression. The current waveform URroTable is generated so that the locus of the actuator matches with RRO.

Figure 27:
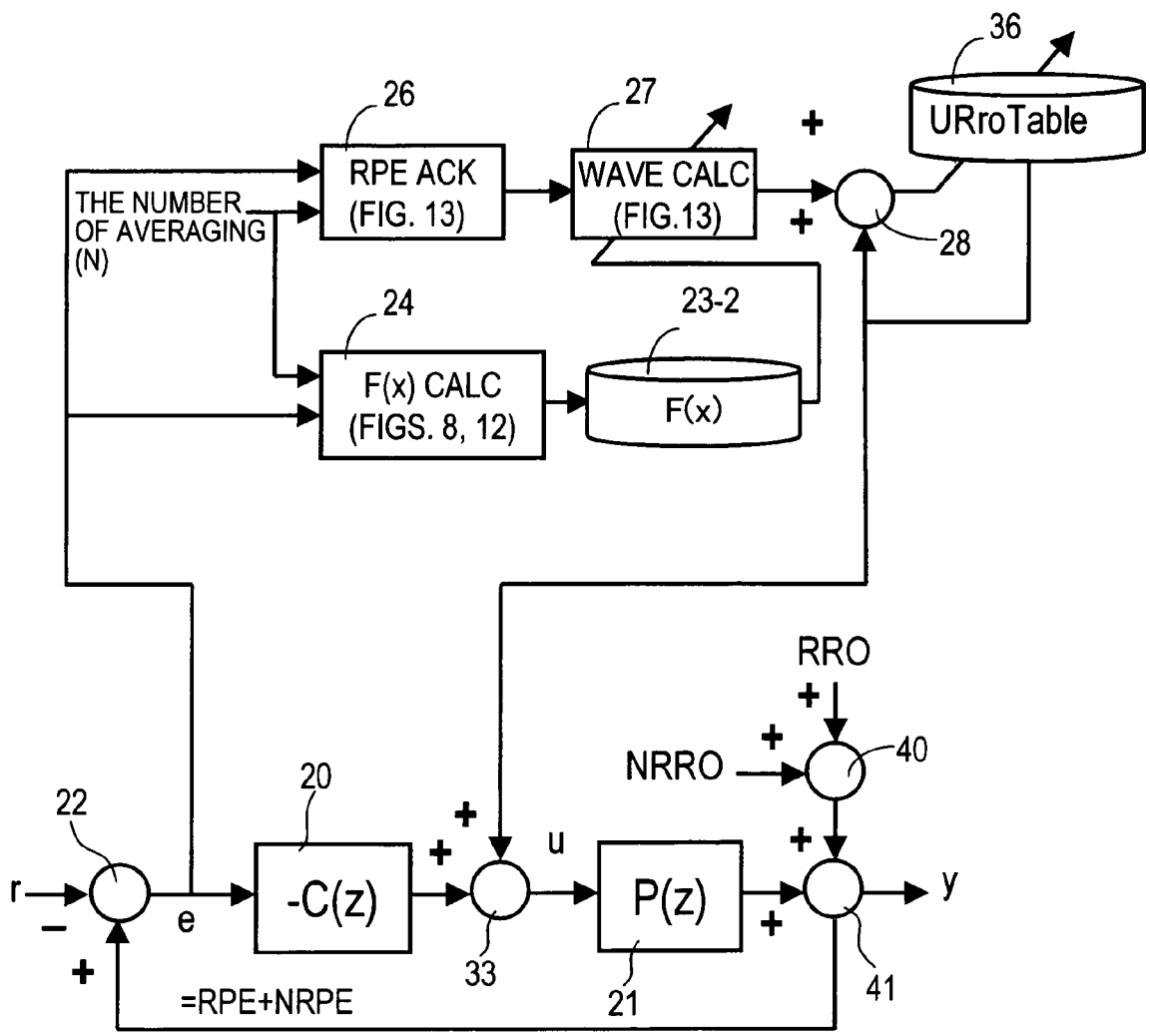
FIG. 27 is a block diagram depicting a servo control system having the URRO correction function according to the first embodiment of the present invention.

FIG. 27 is a block diagram depicting the case when the optimum value calculation and the URRO correction table creation are performed by a single disk device unit, where the composing elements the same as in FIG. 17 are denoted with the same reference numerals. In other words, the computation block 22 determines the error 'e' between the target position 'r' and the current (observing) position 'y', the controller 20 performs control computation and calculates the control amount, the addition block 30 adds the URRO correction values of the URRO correction table 36, and drives the VCM 1, that is the plant 21. For the position of the plant 21, servo signals from the magnetic head 3 are demodulated and the current position 'y' is acquired. The difference between this current position 'y' and the target position 'r' is the position error 'e'. As external disturbances to be applied to this control system, components synchronizing with rotation of the spindle motor 5 and the components not synchronizing therewith are indicated as RRO, NRRO, RPE and NRPE.

As described in FIG. 13, the RPE acquisition block 26 acquires RPE from the position error 'e' for each sector. The F(x) computation block 23-1 computes one filter function value F(x) where a series of DFT computation expressions are integrated based on the position error 'e', as described in FIG. 12. However in the case of URRO, the transfer function is as in Expression (7), that is $P(z)/(1+C(z) \cdot P(z))$ must be determined, the current disturbance ud(i) is applied to the computation block 33 in FIG. 12, instead of the position disturbance d(i). In other words, the flow in FIG. 12 can be used only by replacing "d(i)" with "ud(i)".

The function F(x) table 23-2 stores the computed filter function F(x). The waveform calculation block 27 multiplies the RPE acquired in the RPE acquisition block 26 by the function F(x), and calculates the URRO waveform as described in FIG. 9 and FIG. 13. The URRO table 36 stores the URRO waveform. The addition block 28 adds the URRO waveform for the number of repeats, and updates the table 36 as described in FIG. 13.

After creating the URRO table 36, the computation block 33 adds the URroTable value in the correction table 36 to the control amount of the controller 20, and generates the control amount 'U' in the magnetic disk device operating status (particularly in the following status). By this, URRO correction is performed on the output of the controller 20.

According to the above-mentioned Expression (7), a URroTable value is determined for RPE through the reverse characteristic of the sensitivity function $(1+C(z) \cdot P(z))$ and the reverse characteristic of the plant $(1/P(z))$. Therefore in the filter function F(x), a(m) and b(m) of the above mentioned Expression (13) are different due to the deformation in FIG. 12 described for the F(x) computation block 23-1, for the amount of the reverse characteristic of the plant $(1/P(z))$ in Expression (7).

Figure 28:
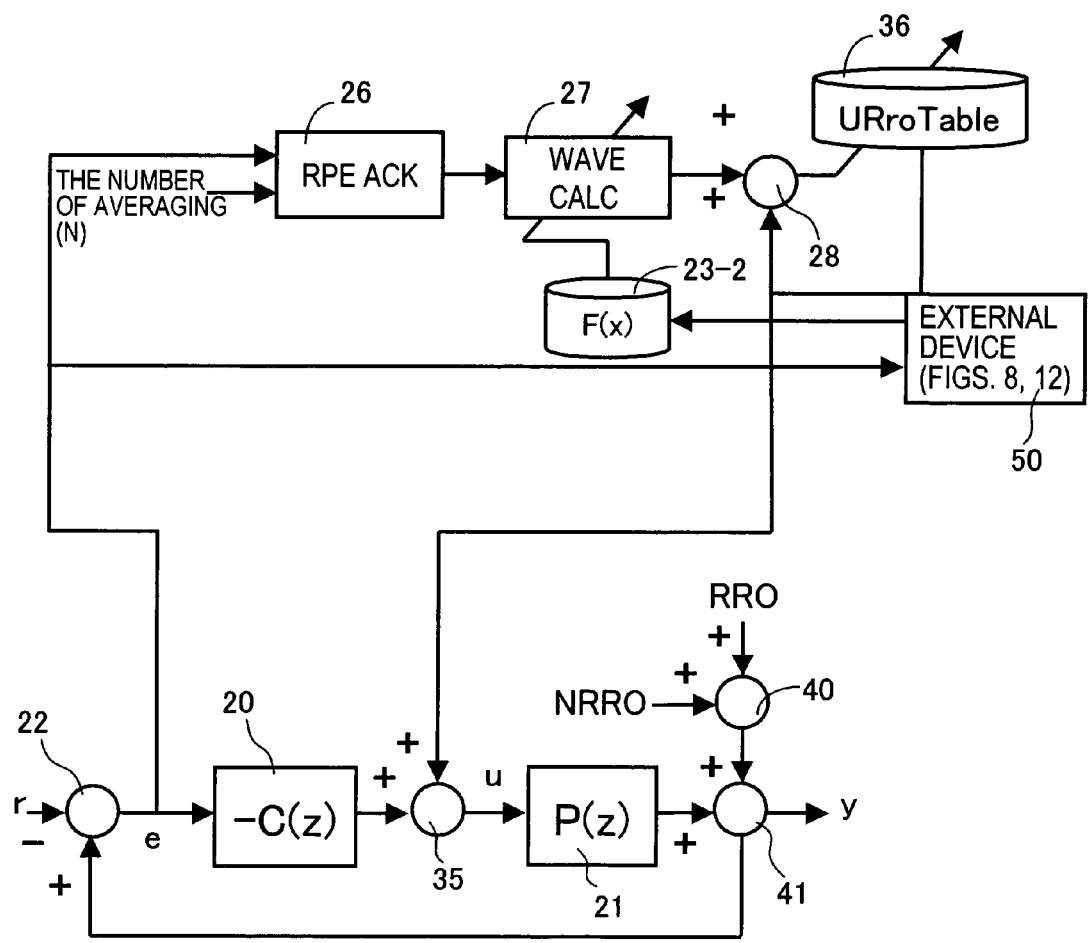
FIG. 28 is a block diagram depicting another servo control system having the URRO correction function according to the first embodiment of the present invention.

FIG. 28 is a block diagram depicting the URRO correction table creation system according to the second embodiment of the present invention. In FIG. 28, composing elements the same as FIG. 7 and FIG. 27 are denoted with the same reference numerals, and the difference from FIG. 27 is that the filter function value F(x) calculation processing 23-1 is executed by an external device (e.g. personal computer) 50 connected to the disk device, and the result is set in the F(x) table 23-2 in the disk device. When this configuration is used, the filter function F(x) is calculated using the external device 50, so the load of the MCU 14 of the disk device is decreased, and calculation speed increases.

Figure 29:
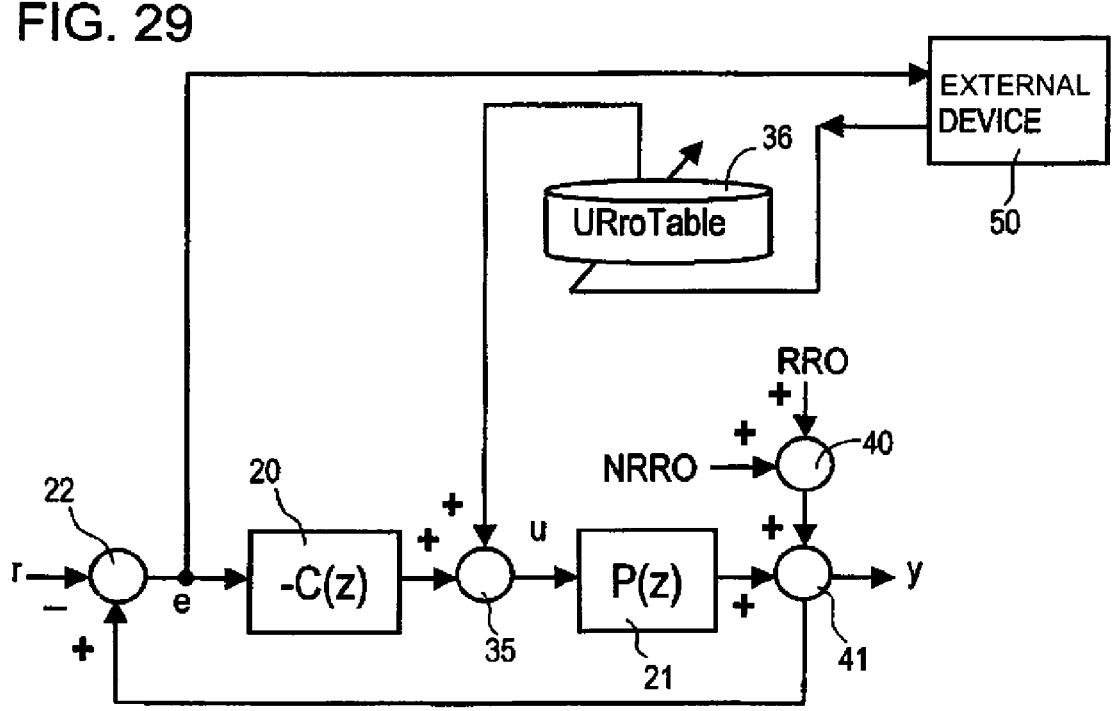
FIG. 29 is a block diagram depicting still another servo control system having the URRO correction function according to the first embodiment of the present invention.

FIG. 29 is a block diagram depicting the URRO correction table creation method according to the third embodiment of the present invention. In FIG. 29, composing elements the same as FIG. 7 and FIG. 27 are denoted with the same reference numerals, and the difference from FIG. 27 is that the filter function value F(x) calculation processing 23-1, RPE acquisition processing 26 (FIG. 13) and waveform calculation processing 27 (FIG. 13) are executed by the external device (e.g. personal computer) 50 connected to the disk device, and the result is set in the URRO correction table 36 in the disk device.

When this configuration is used, the table values of the URRO correction table 36 are calculated using the external device 50, so the load of the MCU 14 of the disk device is decreased further, and calculation speed increases. Also a correction table creation-processing program is unnecessary in the disk device after shipment of the disk device, so the time required for loading this program into the disk device is eliminated.

Also just like RRO, for a plurality of disk devices of a same lot, the correction table 36 of a representative disk device is created with the configuration in FIG. 27 to FIG. 29, and this correction table 36 can be copied to other disk devices. This can further decrease manufacturing time.

Figure 30:
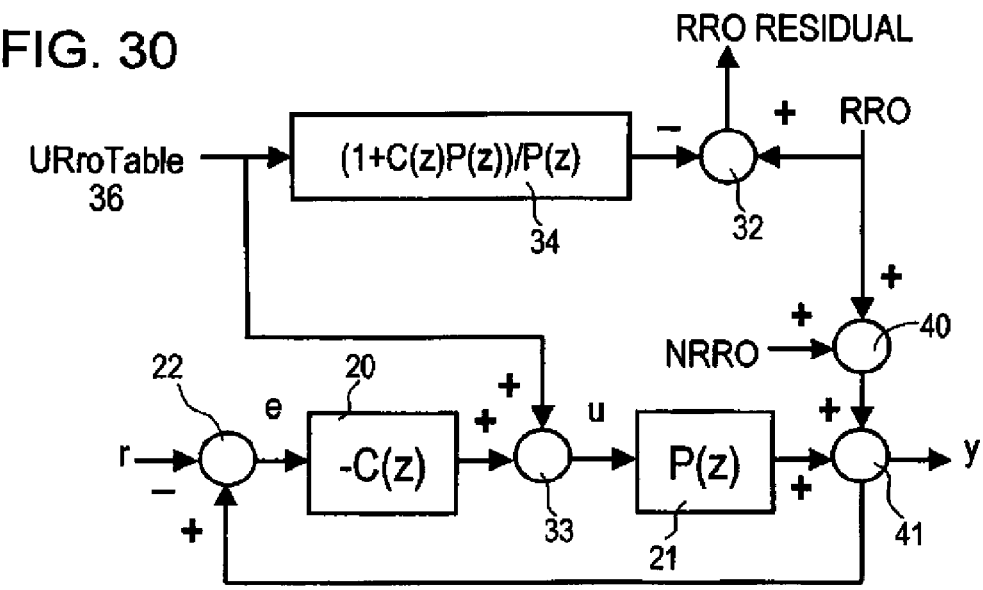
FIG. 30 is a diagram depicting the optimum gain and the residual RRO in the URRO correction of the present invention.

Also just like FIG. 17, optimum processing for an additional gain K can be performed. FIG. 30 is a diagram depicting the evaluation function thereof. In FIG. 30, composing elements the same as FIG. 18 are denoted with the same reference numerals. According to Expression (7), the residual RRO is the result of subtracting the value acquired through $((1+C(z) \cdot P(z)/P(z))$ in block 34, as the URRO correction value in the URroTable 36, from the actual RRO.

Also according to Expression (5), the RroTable value is determined for RPE through the reverse characteristic $(1+C(z) \cdot P(z))$ of the sensitivity function, so the URroTable value is given by the following Expression (38).

$$URrotable = (-1/P(z)) \cdot RroTable \quad (38)$$

In other words, the evaluation function is the same as Expression (29) in the case of RRO, but the URRO correction table 36 is acquired by the waveform calculation block 27 converting the RroTable value into a URroTable value according to the relational Expression (7).

Fifth Embodiment of RRO Correction Table Creation Method Considering Correlation Between Tracks The above-mentioned method is based on the assumption that no correlation of RRO exists between the tracks of a disk. However the correction of RRO between tracks may increase in some cases. For example, when a disk is mechanically distorted, some improvement is required in addition to a method of determining the RRO correction value at one point or in each zone on the disk face. With the foregoing in view, an embodiment to support such a status will be described. In other words, an RroTable value is created in each track.

Figure 31:
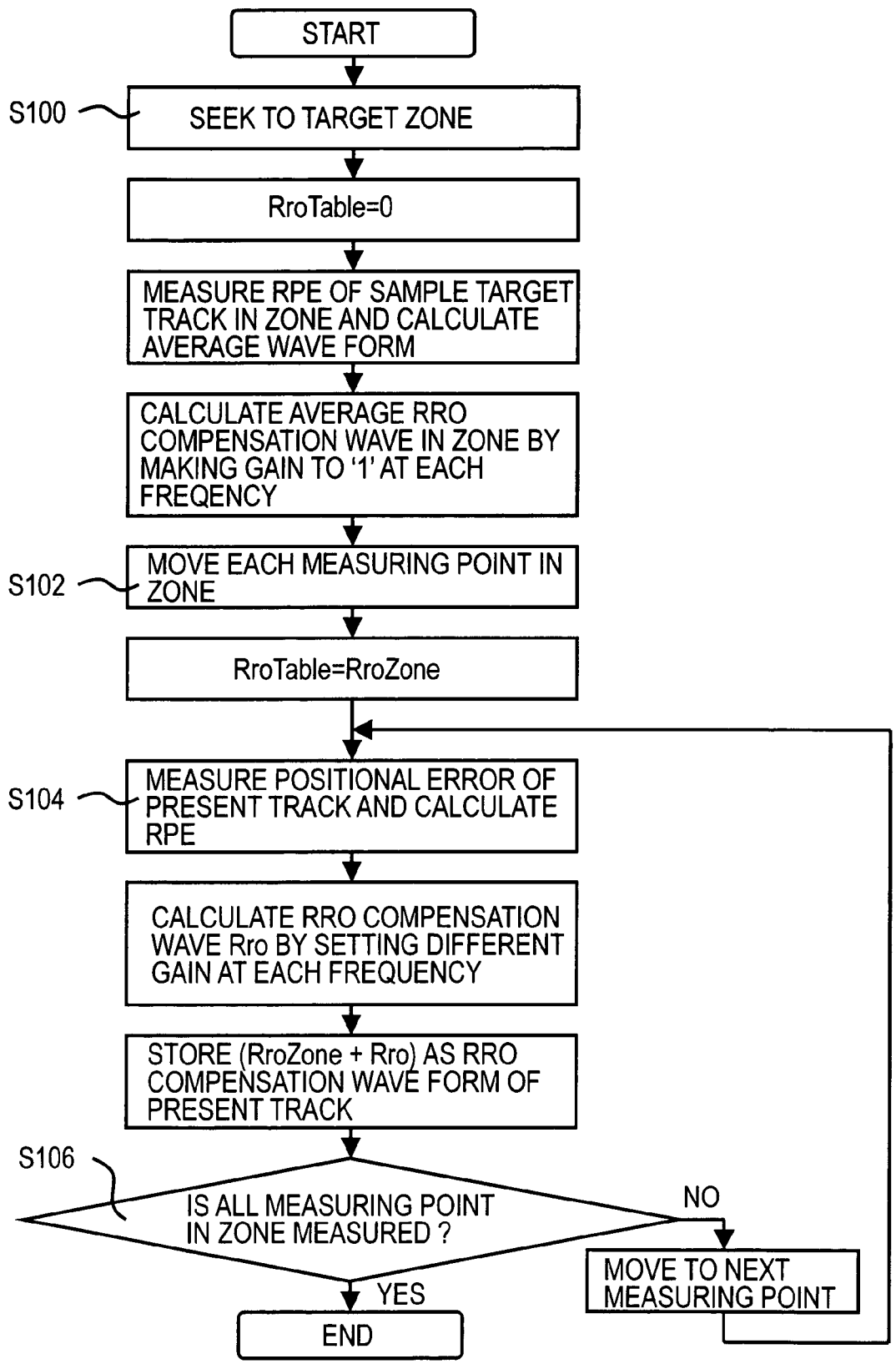
FIG. 31 is a flow chart depicting the RroTable creation processing having the track correlation according to the fifth embodiment of the present invention.
Figures 32, 33:
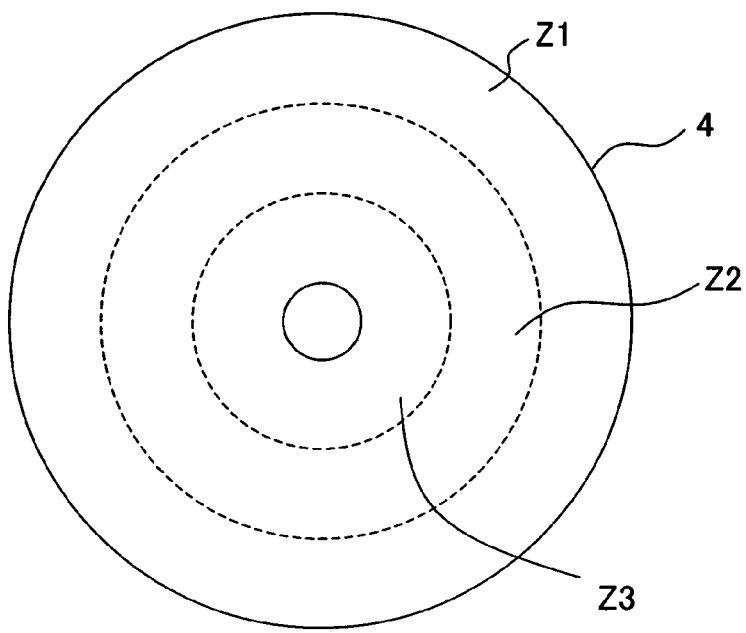
FIG. 32 is a diagram depicting the zone division in FIG. 31.
FIG. 33 shows the RroTable in FIG. 31.

FIG. 31 is a flow chart depicting RRO correction table creation processing considering the correlation between tracks, and FIG. 32 and FIG. 33 described the processing flow.

(S100) As FIG. 32 shows, the disk 4 with the same head is divided into a plurality of zones Z1, Z2 and Z3. First a common RRO correction value is created within the zone. In other words, the target head is moved to the target zone of the disk 4, and the RroTable value is initialized to "0". An average RPE waveform of the sampling target track within the zone is determined, and the zone average RRO correction waveform RroZone is calculated, setting an additional gain uniform for all frequencies as "1".

(S102) Then the head is positioned to a measurement point (e.g. each track) within the zone using this RroZone as an initial value, and the RroZone value is stored in the RroTable 29, as shown in FIG. 33.

(S104) The position error 'e' of the current track after moving is measured for a specified number of rotations N, and RPE is calculated, as mentioned above. And for each frequency described in FIG. 22, the RRO correction waveform RRO(q) is calculated in the processing in FIG. 24, using the filter function F(x) including a different additional gain. And as FIG. 33 shows, the RRO correction value of the current track is stored in the RroTable 29. In the case of an example where the magnetic head 3 has an MR head as the read element, in addition to a write element, a rotary actuator is used, and the positions of the write element and read element for the track are different. Therefore in RroTable 29 in FIG. 33, the RRO value of the read element is measured and stored as RRO(R) independently from the RRO value of the write element, which is RRO(W).

(S106) Then it is judged whether all the measurement points within the zone have been measured. If all the measurement points within the zone have not been measured, the head is moved to the next measurement point, and processing returns to step S104. If all the measurement points within the zone have been measured, creation of the RroTable in the zone ends.

This is repeated for the number of divided zones shown in FIG. 32, and the RroTable 29 in FIG. 33 is created. In this way, the disk 4 with a same head is divided into a plurality of zones, a common RRO correction value in the zone is calculated first, and the zone average RRO correction waveform RroZone is calculated with setting an additional gain uniform for all frequencies as "1". Then using this RroZone as the initial value, the head is moved to a measurement point in the zone (e.g. each track) and measurement is performed for a specified number of rotations N, RPE is calculated, and using a filter function F(x) including a different additional gain depending on the frequency, the RRO correction waveform RRO(q) is measured in the processing in FIG. 24.

Therefore when the correlation of RRO between tracks is high, such as the case when the disk is mechanically distorted, an RRO correction value of the measurement point in each track can be measured, and an accurate RRO correction is possible, even is such a status.

Servo Track Write Method Using RRO Correction Table

Now an embodiment using the correction table created as above will be described. The first embodiment concerned manufacturing the disk device. The disk where servo signals are externally recorded is installed in the disk device, and a correction table for all the tracks is generated for each read and write position. Or a plurality of tracks may constitute a zone, and common components within the zone may be corrected.

Figure 34:
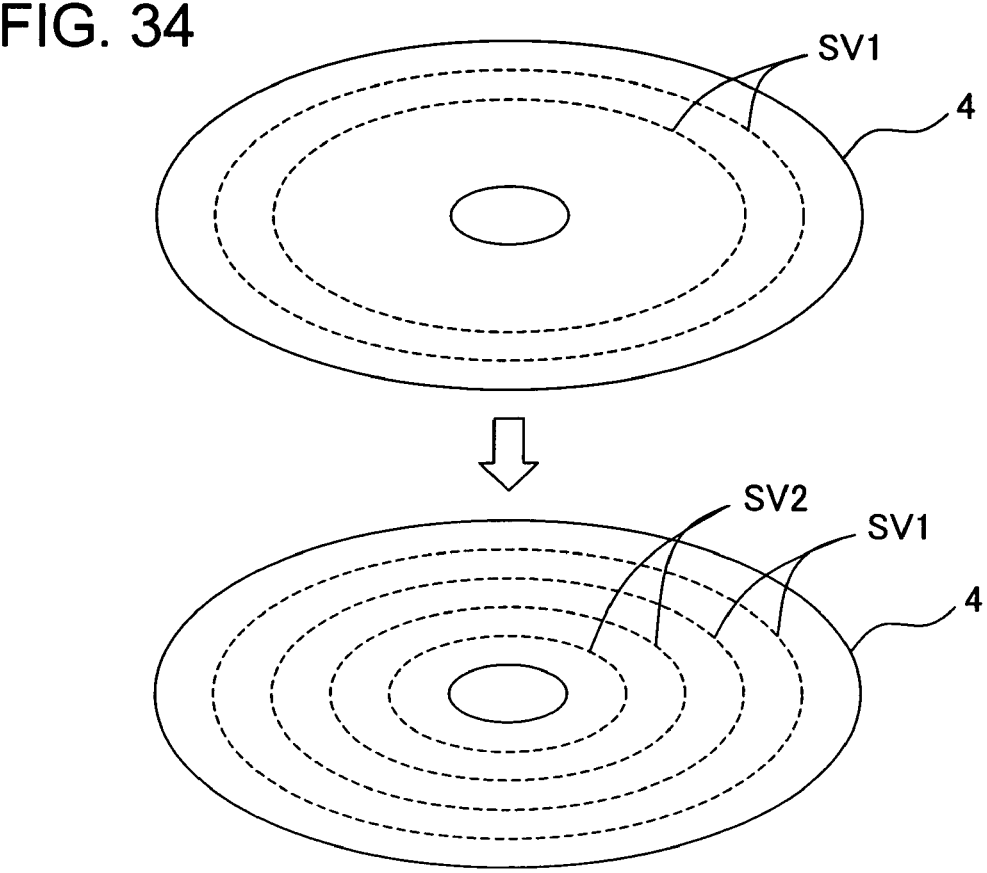
FIG. 34 is a diagram depicting a servo track write method using the RRO correction table in FIG. 7.

The second embodiment is used when servo signals are recorded on the disk drive. FIG. 34 is a diagram describing this. A servo signal recording method is a self-servo writing method. As FIG. 34 shows, several tracks of servo signals SV1 are recorded with a predetermined feeding width at the edges (outer track in this case) of the disk 4. Then based on these servo signals SV1, the servo signals SV2 are recorded in an area where the servo signals are not recorded on the disk 4.

When the servo signals SV1 are recorded at the edge of the disk 4 (outer track in this case), the RRO correction value is measured, and using this RRO correction value, the servo signals SV2 are recorded in an area where the servo signals are not recorded on the disk 4, based on the servo signals SV1. And the RRO correction value is measured for all the tracks, and the RroTable 29 is created.

Figure 35:
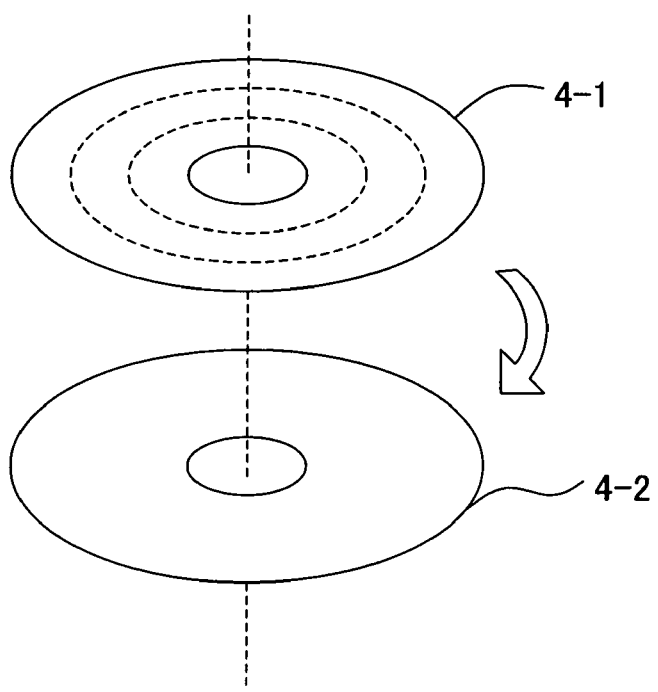
FIG. 35 is a diagram depicting another servo track write method using the RRO correction table in FIG. 7.

The third embodiment is used for a servo signal recording method called "copy STW" or "rewrite STW". FIG. 35 is a diagram depicting this servo track write method. As FIG. 35 shows, servo signals are externally recorded on the entire face of at least one side of the disk 4-1 in advance, and the disk 4-1, where the servo signals are recorded and a disk 4-2 where servo signals are not recorded, are installed on the disk device.

And while positioning control is performed using the servo signals on one side of the disk 4-1, the RRO correction value is measured, and using this RRO correction value, servo signals are recorded on the face where servo signals have not yet been recorded (rear side of the disk 4-1 and the disk 4-2). And RroTable 29 is created by measuring the RRO correction values of all the tracks. In this case, servo signals may also be rewritten on the side of the disk 4-1 where the servo signals have been recorded from the beginning, using the RRO correction value, and the original servo signals may be deleted later.

Figures 36, 37:
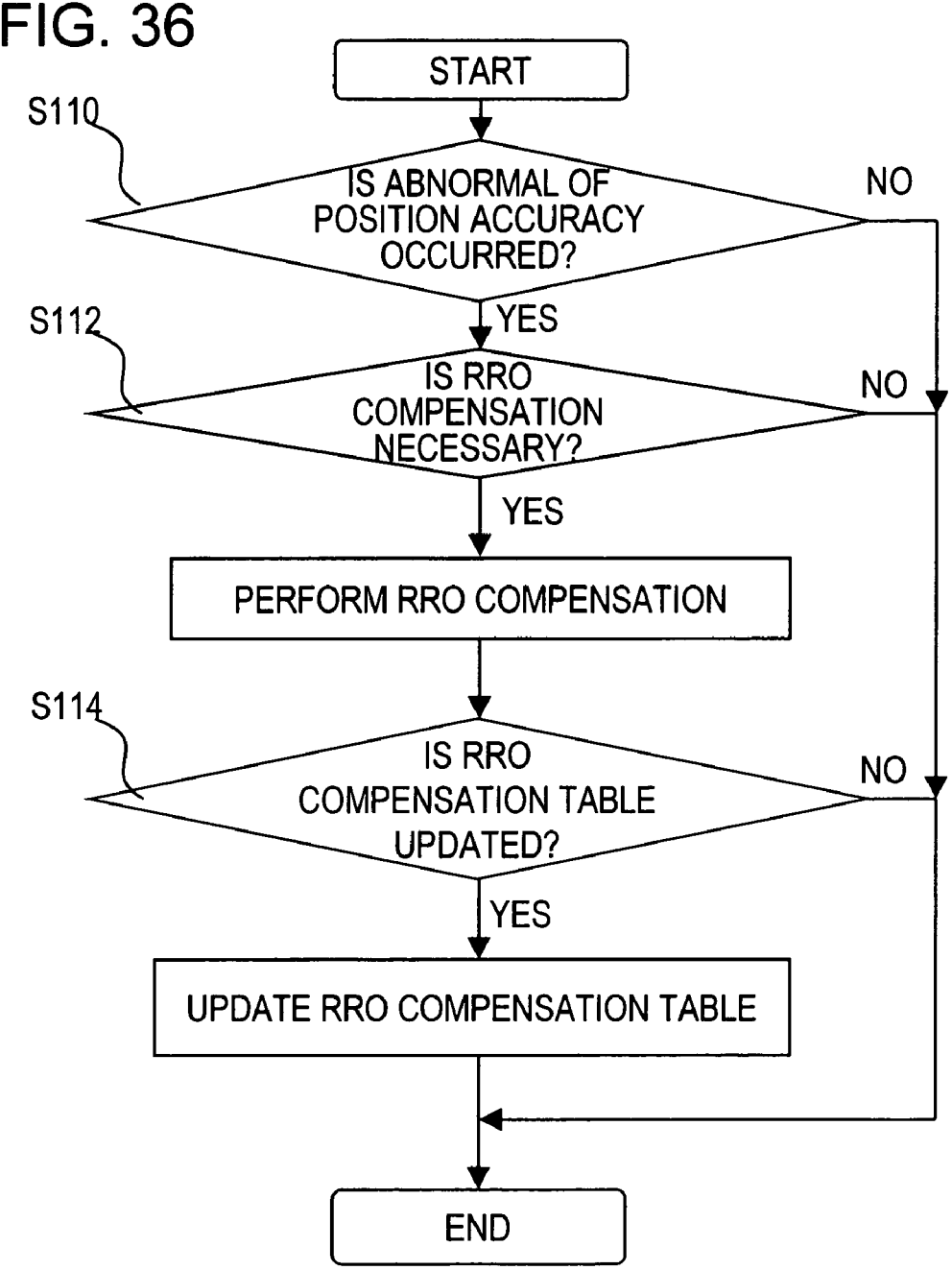
FIG. 36 is a flow chart depicting the servo track rewrite method using the RRO correction table in FIG. 7.
FIG. 37 shows the storage location of the RRO correction table in FIG. 7.
Figure 38:
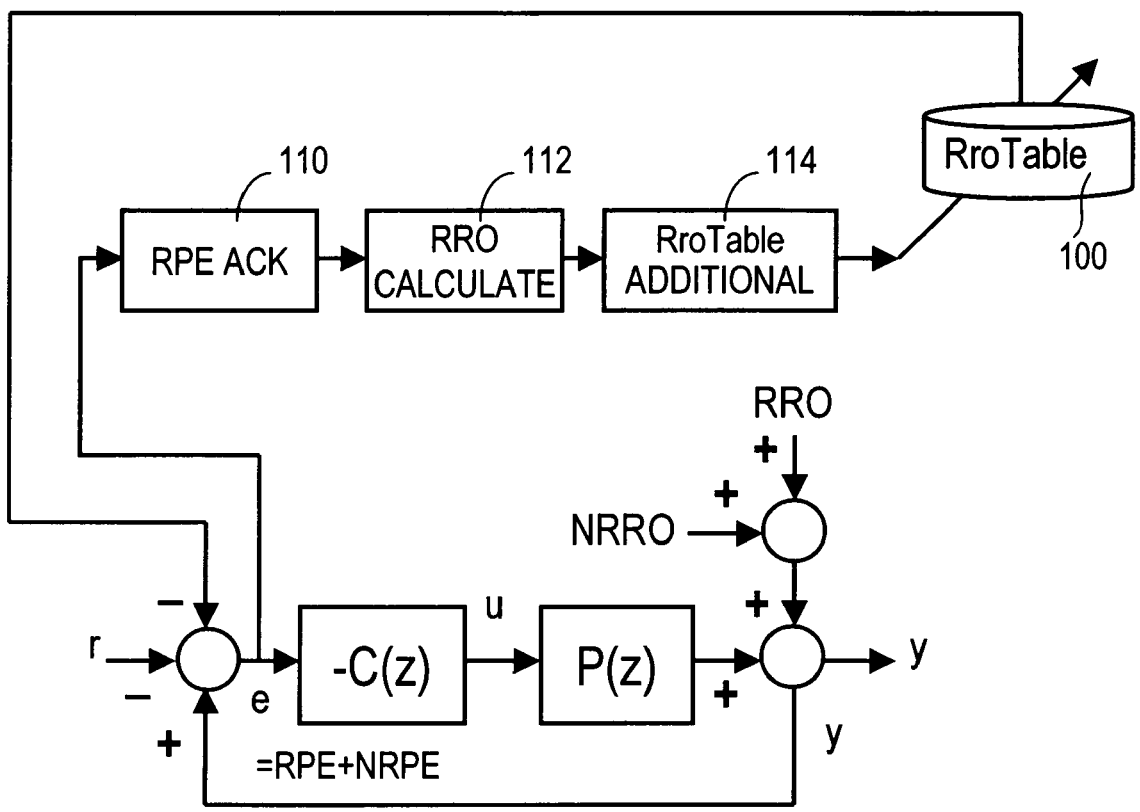
FIG. 38 is a block diagram depicting the servo control system using a conventional RRO correction table.
Figure 39:
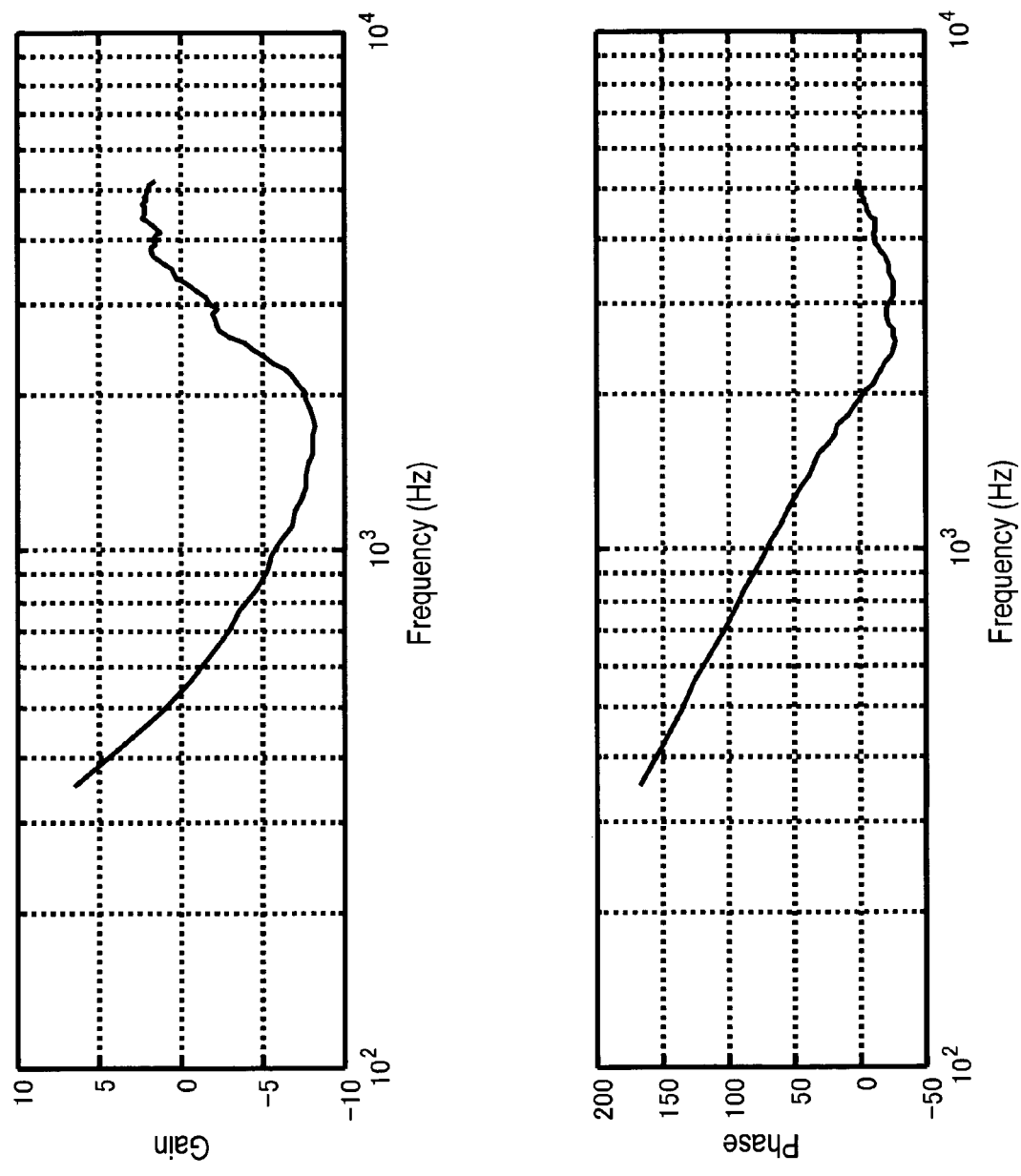
FIG. 39 are graphs depicting the sensitivity function in FIG. 38.
Figure 40:
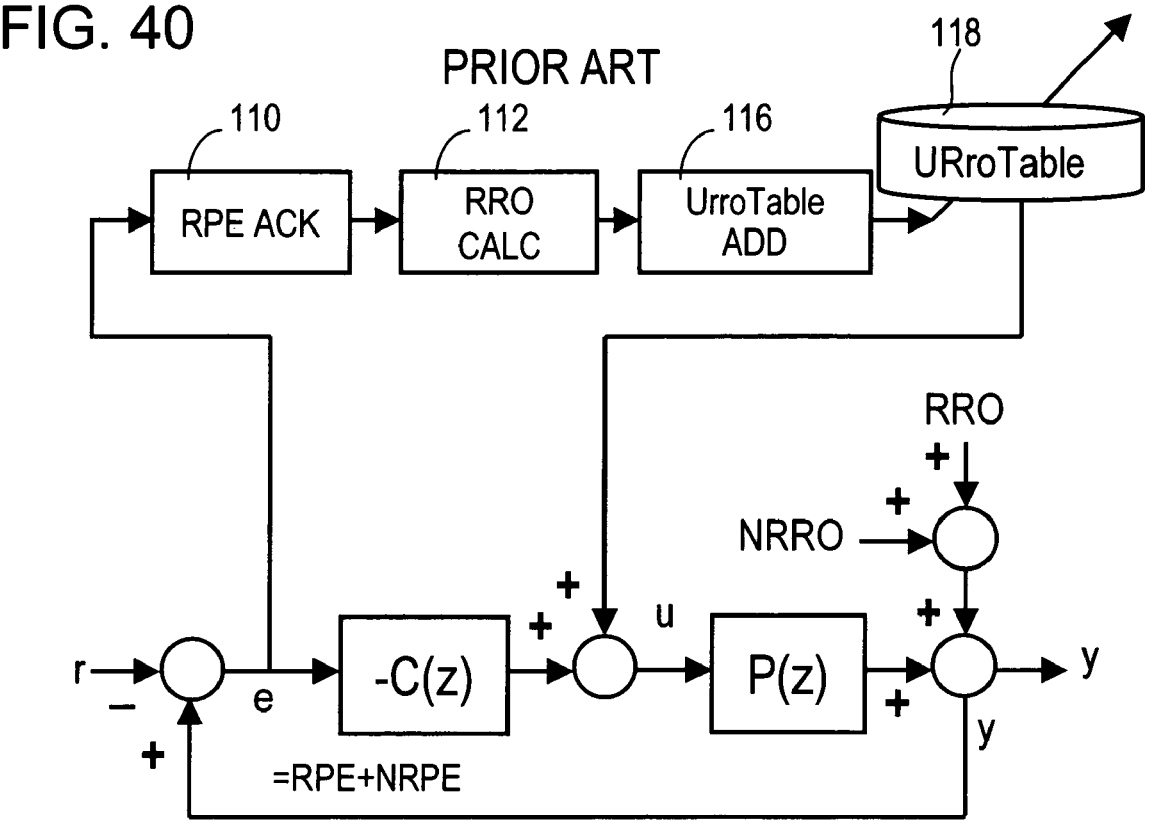
FIG. 40 is a block diagram depicting the servo control system using a conventional URRO correction table.

The fourth embodiment is to be used after shipping the disk device. When the servo signals reach a status which is different from that during manufacturing, such as the case of an eccentricity due to mechanical deformation or loss of servo signals due to a media scratch, the fourth embodiment is used to generate signals that follow-up or do not follow-up RRO. This makes a highly accurate correction possible with a small number of times of rotation. FIG. 36 is a flow chart depicting this correction table rewriting method.

(S110) The MCU 14 of the disk device judges whether a positioning accuracy abnormality occurred. For example, when the head cannot be positioned at the target track center (position error is more than off track standard value), even after positioning control using the above-mentioned RRO correction table 29, a retry is performed. If the head cannot be positioned at the target track center even after a plurality of times of retry, it is judged that the positioning accuracy is abnormal.

(S102) If it is judged as a positioning accuracy abnormality, it is then judged whether recovery is possible by RRO correction. For example, if the head detection capability has dropped, then recovery is not possible even if RRO correction is performed. If it is judged that recovery is possible with RRO correction, the MCU 14 measures the RRO correction values, as mentioned above.

(S104) Then it is judged whether rewriting of the RRO correction table 29 is effective by comparing the RRO correction value measurement result and the correction values of the current RRO correction table 29. For example, if the RRO correction value measurement result and the correction values of the current RRO correction table 29 are not very different, positioning accuracy does not improve even if the correction table 29 is rewritten, so processing ends. If the RRO correction value measurement result and the correction values of the current RRO correction table 29 are different, positioning accuracy improves by rewriting the correction table 29, so the correction table 29 is rewritten, and processing ends.

In this way, when the servo signals reach a status which is different from that during manufacturing, such as the case when an eccentricity is generated due to mechanical deformation or loss of servo signals due to a media scratch, the servo signals can be rewritten to be signals that follow-up or that do not follow-up RRO, which can contribute to improving the positioning accuracy.

Other Embodiments

There are some possible locations where the above correction data (table) can be recorded. As FIG. 37 shows, the correction data RroTable(q) may be added at the end of the servo signals in each sectors. Or correction data may be recorded in a dedicated area on the disk 4 media that is not used for recording/regenerating data. Also the correction data may be recorded in a non-volatile memory on an electronic circuit of a disk device in advance.

Of these three recording locations, the first or second method is effective when all the individual track are corrected. If only the track of which the positional fluctuation is large is corrected, that is the correction data volume is small, then the third method (non-volatile memory) may be used. The above method is effective when the disk of the disk device is fixed. That is, the media is a non-removable disk. Even in the case when the disk is fixed in a magnetic disk drive, such as magnetic transfer and patterned media, if the servo signals on the media are formed using a common die, then a common RRO, which is determined depending on the die creation accuracy, can be measured, and the disk can be used as media.

The disk device was described as a magnetic disk device, but the present invention can be applied to other disk media, such as an optical disk device and magneto-optical disk device. In the same way, RRO was described for the embodiment in FIG. 22, but the present invention can also be applied to the URRO described in FIG. 27.

The present invention was described using embodiments, but various modifications are possible for the present invention within the scope of the essential character of the present invention, which shall not be excluded from the scope of the present invention.

Since the value of the filter function F(x) is calculated in advance, and when the RRO correction table is created, the rotation component correction signal can be calculated using this filter function F(x) value without frequency conversion, so the present invention can dramatically decrease the correction table creation time and contribute to the improvement of productivity of the disk device. Therefore disk devices which perform rotation synchronizing correction can be manufactured in a shorter time, and disk devices suitable for mass production can be implemented at low cost.

What is claimed is:

1. A correction table creation method of head position control for creating correction signals for correcting components synchronizing rotation of a disk, comprising steps of:
   measuring position error components synchronizing rotation of said disk from an average waveform of a position error between a detected position based on a position signal from a head for at least reading said disk and a target position;
   generating correction signals from a filter function in time units, that is created from measured frequency characteristics of a position control system of said head and repeat frequency of the rotation of said disk, and said measured position error component; and
   storing said correction signals in the correction table,
   wherein said generation step further comprises a step of generating said correction signal RRO by the filter function in time unit F(x) defined by the following Expression (13), where RPE is an average waveform of said position error signal, RRO is a correction signal, Ns is a number of servo sectors of one rotation of a track of said disk, and a(m)+jb(m) is said frequency characteristics, that is m time of the rotation frequency of said disk:

$$RRO(q) = \sum_{k=0}^{N_s-1} RPE(k)F(k-q) \tag{13}$$

$$F(x) = \sum_{m=1}^{N_s/2-1} \{a(m)\cos(2\pi mx/N_s) - b(m)\sin(2\pi mx/N_s)\}(2/N_s).$$

2. A correction table creation method of head position control for creating correction signals for correcting components synchronizing rotation of a disk, comprising steps of:
   measuring position error components synchronizing rotation of said disk from an average waveform of a position error between a detected position based on a position signal from a head for at least reading said disk and a target position;
   generating correction signals from a filter function in time units, that is created from measured frequency characteristics of a position control system of said head and repeat frequency of the rotation of said disk, and said measured position error component; and
   storing said correction signals in the correction table,
   wherein said generation step further comprises a step of generating said correction signal RRO by the filter function in time unit F(x) defined by the following Expression (37), where RPE is an average waveform of said position error signal, RRO is a correction signal, Ns is a number of servo sectors of one rotation of a track of said disk, a(m)+jb(m) is said frequency characteristics, that is m time of the rotation frequency of said disk, and Krro(m) is an additional gain of said correction table:

$$RRO(q) = \sum_{k=0}^{N_s-1} RPE(k)F(k-q)$$

$$F(x) = \sum_{m=1}^{N_s/2-1} \{a(m)\cos(2ronx/Ns) - b(m)\sin(2mnx/Ns)\}Krro(m)$$

$$x = 0, 1, \ldots, (Ns-1).$$

3. The correction table creation method of head position control according to claim 1, further comprising a step of measuring the frequency characteristics of the position control system of said head and creating the filter function in time units from said measured frequency characteristics and repeat frequency of the rotation of said disk.

4. The correction table creation method of head position control according to claim 3,
   wherein said filter function creation step further comprises:
   a step of applying a sine disturbance to said position control system and observing the signal of said position control system;
   a step of computing position error synchronizing rotation of said disk from said observed signal; and
   a step of calculating the ratio of said disturbance and said position error in frequency units and calculating the frequency characteristics of the position control system of said head.

5. A head position control method for controlling a position of a head for at least reading information of a disk using signals where the position signals of said disk are corrected by components synchronizing rotation of said disk, comprising steps of:

calculating a position error between a target position and a current position based on the position signal from said head;

reading a correction signal from a correction table for storing said correction signal acquired from a filter function in time units, that is created from the measured frequency characteristics of a position control system of said head and repeat frequency of rotation of said disk, and measured position error component synchronizing rotation of said disk; and controlling said head position based on said position error and said correction signal, wherein said reading step further comprises a step of reading said generated correction signal RRO by the filter function in time unit F(x) defined by the following Expression (13), where RPE is an average waveform of said position error signal, RRO is a correction signal, Ns is a number of servo sectors of one rotation of a track of said disk, and a(m)+jb(m) is said frequency characteristics, that is m times of the rotation frequency of said disk:

$$RRO(q) = \sum_{k=0}^{N_s-1} RPE(k)F(k-q) \qquad (13)$$

$$F(x) = \sum_{m=1}^{N_s/2-1} \{a(m)\cos(2\pi mx/N_s) - b(m)\sin(2\pi mx/N_s)\}(2/N_s).$$

6. A head position control method for controlling a position of a head for at least reading information of a disk using signals where the position signals of said disk are corrected by components synchronizing rotation of said disk, comprising steps of:

calculating a position error between a target position and a current position based on the position signal from said head;

reading a correction signal from a correction table for storing said correction signal acquired from a filter function in time units, that is created from the measured frequency characteristics of a position control system of said head and repeat frequency of rotation of said disk, and measured position error component synchronizing rotation of said disk; and controlling said head position based on said position error and said correction signal, wherein said reading step further comprises a step of reading said generated correction signal RRO by the filter function in time unit F(x) defined by the following Expression (37), where RPE is an average waveform of said position error signal, RRO is a correction signal, Ns is a number of servo sectors of one rotation of a track of said disk, a(m)+jb(m) is said frequency characteristics, that is m times of the rotation frequency of said disk, and Krro(m) is an additional gain of said correction table:

$$RRO(q) = \sum_{k=0}^{Ns-1} RPE(k)F(k-q)$$

$$F(x) = \sum_{m=1}^{Ns/2-1} \{a(m)\cos(2ronx/Ns) - b(m)\sin(2mnx/Ns)\}Krro(m)$$

$$x = 0, 1, \ldots, (Ns-1).$$

7. The head position control method according to claim 5, further comprising a step of measuring the frequency characteristics of the position control system of said head and creating the filter function in time units from said measured frequency characteristics and repetition frequency of the rotation of said disk.

8. The head position control method according to claim 7, wherein said filter function creation step further comprises:

a step of applying a sine disturbance to said position control system and observing the signal of said position control system;

a step of computing position error synchronizing rotation of said disk from said observed signal; and a step of calculating the ratio of said disturbance and said position error in frequency units and calculating the frequency characteristics of the position control system of said head.

* * * * *